United States Patent
Colgrove et al.

(10) Patent No.: US 11,163,624 B2
(45) Date of Patent: Nov. 2, 2021

(54) DYNAMICALLY ADJUSTING AN AMOUNT OF LOG DATA GENERATED FOR A STORAGE SYSTEM

(71) Applicant: Pure Storage, Inc., Mountain View, CA (US)

(72) Inventors: John Colgrove, Los Altos, CA (US); Sergey Zhuravlev, Gilroy, CA (US)

(73) Assignee: Pure Storage, Inc., Mountain View, CA (US)

( * ) Notice: Subject to any disclaimer, the term of this patent is extended or adjusted under 35 U.S.C. 154(b) by 47 days.

(21) Appl. No.: 15/417,696

(22) Filed: Jan. 27, 2017

(65) Prior Publication Data

US 2018/0217888 A1     Aug. 2, 2018

(51) Int. Cl.
*G06F 11/34*       (2006.01)
*G06F 11/07*       (2006.01)
*G06F 11/30*       (2006.01)
*G06F 17/40*       (2006.01)

(52) U.S. Cl.
CPC ........ *G06F 11/0727* (2013.01); *G06F 11/076* (2013.01); *G06F 11/0757* (2013.01); *G06F 11/0787* (2013.01); *G06F 11/3034* (2013.01); *G06F 11/3072* (2013.01); *G06F 17/40* (2013.01); *G06F 11/079* (2013.01); *G06F 11/3409* (2013.01); *G06F 11/3476* (2013.01); *G06F 11/3485* (2013.01); *G06F 2201/81* (2013.01)

(58) Field of Classification Search
CPC ............. G06F 11/0727; G06F 11/3476; G06F 11/0757; G06F 11/076

USPC ..................................................... 714/42, 45
See application file for complete search history.

(56) References Cited

U.S. PATENT DOCUMENTS

| | | | |
|---|---|---|---|
| 5,706,210 A | 1/1998 | Kumano et al. | |
| 5,799,200 A | 8/1998 | Brant et al. | |
| 5,933,598 A | 8/1999 | Scales et al. | |
| 6,012,032 A | 1/2000 | Donovan et al. | |

(Continued)

FOREIGN PATENT DOCUMENTS

| EP | 0725324 A2 | 8/1996 |
|---|---|---|
| JP | 11327965 A * | 11/1999 |

(Continued)

OTHER PUBLICATIONS

The International Search Report and the Written Opinion received from the International Searching Authority (ISA/EPO) for International Application No. PCT/US2016/036693, dated Aug. 29, 2016, 10 pages.

(Continued)

*Primary Examiner* — Chae M Ko

(57) ABSTRACT

Dynamically adjusting an amount of log data generated for a storage system that includes a plurality of storage devices, including: setting, for a component within the storage system, a logging level for the component, the logging level specifying the extent to which log data should be generated for a particular component; determining, in dependence upon one or more measured operating characteristics of the storage system, whether the logging level for the component should be changed; and responsive to determining that the logging level for the component should be changed, changing the logging level associated with the component.

18 Claims, 11 Drawing Sheets

(56) References Cited

U.S. PATENT DOCUMENTS

| | | | |
|---|---|---|---|
| 6,085,333 A | 7/2000 | DeKoning et al. | |
| 6,643,641 B1 | 11/2003 | Snyder | |
| 6,647,514 B1 | 11/2003 | Umberger et al. | |
| 6,789,162 B1 | 9/2004 | Talagala et al. | |
| 7,089,272 B1 | 8/2006 | Garthwaite et al. | |
| 7,107,389 B2 | 9/2006 | Inagaki et al. | |
| 7,146,521 B1 | 12/2006 | Nguyen | |
| 7,334,124 B2 | 2/2008 | Pham et al. | |
| 7,437,530 B1 | 10/2008 | Rajan | |
| 7,493,424 B1 | 2/2009 | Bali et al. | |
| 7,669,029 B1 | 2/2010 | Mishra et al. | |
| 7,689,609 B2 | 3/2010 | Lango et al. | |
| 7,743,191 B1 | 6/2010 | Liao | |
| 7,899,780 B1 | 3/2011 | Shmuylovich et al. | |
| 8,042,163 B1 | 10/2011 | Karr et al. | |
| 8,086,585 B1 | 12/2011 | Brashers et al. | |
| 8,271,700 B1 | 9/2012 | Annem et al. | |
| 8,387,136 B2 | 2/2013 | Lee et al. | |
| 8,437,189 B1 | 5/2013 | Montierth et al. | |
| 8,465,332 B2 | 6/2013 | Hogan et al. | |
| 8,527,544 B1 | 9/2013 | Colgrove et al. | |
| 8,566,546 B1 | 10/2013 | Marshak et al. | |
| 8,578,442 B1 | 11/2013 | Banerjee | |
| 8,613,066 B1 | 12/2013 | Brezinski et al. | |
| 8,620,970 B2 | 12/2013 | English et al. | |
| 8,745,003 B1* | 6/2014 | Patterson | G06F 17/00 707/639 |
| 8,751,463 B1 | 6/2014 | Chamness | |
| 8,762,642 B2 | 6/2014 | Bates et al. | |
| 8,769,622 B2 | 7/2014 | Chang et al. | |
| 8,800,009 B1 | 8/2014 | Beda, III et al. | |
| 8,812,860 B1 | 8/2014 | Bray | |
| 8,850,546 B1 | 9/2014 | Field et al. | |
| 8,898,346 B1 | 11/2014 | Simmons | |
| 8,909,854 B2 | 12/2014 | Yamagishi et al. | |
| 8,931,041 B1 | 1/2015 | Banerjee | |
| 8,949,863 B1 | 2/2015 | Coatney et al. | |
| 8,984,602 B1 | 3/2015 | Bailey et al. | |
| 8,990,905 B1 | 3/2015 | Bailey et al. | |
| 9,124,569 B2 | 9/2015 | Hussain et al. | |
| 9,134,922 B2 | 9/2015 | Rajagopal et al. | |
| 9,209,973 B2 | 12/2015 | Aikas et al. | |
| 9,250,823 B1 | 2/2016 | Kamat et al. | |
| 9,300,660 B1 | 3/2016 | Borowiec et al. | |
| 9,384,082 B1 | 7/2016 | Lee et al. | |
| 9,444,822 B1 | 9/2016 | Borowiec et al. | |
| 9,507,532 B1 | 11/2016 | Colgrove et al. | |
| 9,760,480 B1* | 9/2017 | McKelvie | G06F 12/0246 |
| 9,779,015 B1* | 10/2017 | Oikarinen | G06F 16/10 |
| 2002/0013802 A1 | 1/2002 | Mori et al. | |
| 2003/0145172 A1 | 7/2003 | Galbraith et al. | |
| 2003/0191783 A1 | 10/2003 | Wolczko et al. | |
| 2003/0225961 A1 | 12/2003 | Chow et al. | |
| 2004/0080985 A1 | 4/2004 | Chang et al. | |
| 2004/0111573 A1 | 6/2004 | Garthwaite | |
| 2004/0153844 A1 | 8/2004 | Ghose et al. | |
| 2004/0193814 A1 | 9/2004 | Erickson et al. | |
| 2004/0260967 A1 | 12/2004 | Guha et al. | |
| 2005/0160416 A1 | 7/2005 | Jamison | |
| 2005/0188246 A1 | 8/2005 | Emberty et al. | |
| 2005/0216800 A1 | 9/2005 | Bicknell et al. | |
| 2006/0015771 A1 | 1/2006 | Vana Gundy et al. | |
| 2006/0129817 A1 | 6/2006 | Borneman et al. | |
| 2006/0161726 A1 | 7/2006 | Lasser | |
| 2006/0230245 A1 | 10/2006 | Gounares et al. | |
| 2006/0239075 A1 | 10/2006 | Williams et al. | |
| 2007/0022227 A1 | 1/2007 | Miki | |
| 2007/0028068 A1 | 2/2007 | Golding et al. | |
| 2007/0055702 A1 | 3/2007 | Fridella et al. | |
| 2007/0109856 A1 | 5/2007 | Pellicone et al. | |
| 2007/0150689 A1 | 6/2007 | Pandit et al. | |
| 2007/0168321 A1 | 7/2007 | Saito et al. | |
| 2007/0208920 A1* | 9/2007 | Tevis | H04L 43/16 711/170 |
| 2007/0220227 A1 | 9/2007 | Long | |
| 2007/0239397 A1* | 10/2007 | Bourne | H04L 43/50 702/183 |
| 2007/0271276 A1* | 11/2007 | Allen | G06Q 10/06 |
| 2007/0294563 A1 | 12/2007 | Bose | |
| 2007/0294564 A1 | 12/2007 | Reddin et al. | |
| 2007/0299631 A1* | 12/2007 | Macbeth | G06Q 10/10 702/187 |
| 2008/0005587 A1 | 1/2008 | Ahlquist | |
| 2008/0077358 A1 | 3/2008 | Marvasti | |
| 2008/0077825 A1 | 3/2008 | Bello et al. | |
| 2008/0162674 A1 | 7/2008 | Dahiya | |
| 2008/0168308 A1* | 7/2008 | Eberbach | G06F 11/008 714/26 |
| 2008/0195833 A1 | 8/2008 | Park | |
| 2008/0270678 A1 | 10/2008 | Cornwell et al. | |
| 2008/0282045 A1 | 11/2008 | Biswas et al. | |
| 2009/0077340 A1 | 3/2009 | Johnson et al. | |
| 2009/0100115 A1 | 4/2009 | Park et al. | |
| 2009/0198889 A1 | 8/2009 | Ito et al. | |
| 2010/0052625 A1 | 3/2010 | Cagno et al. | |
| 2010/0211723 A1 | 8/2010 | Mukaida | |
| 2010/0246266 A1 | 9/2010 | Park et al. | |
| 2010/0257142 A1 | 10/2010 | Murphy et al. | |
| 2010/0262764 A1 | 10/2010 | Liu et al. | |
| 2010/0325345 A1 | 12/2010 | Ohno et al. | |
| 2010/0332754 A1 | 12/2010 | Lai et al. | |
| 2011/0067008 A1* | 3/2011 | Srivastava | G06F 11/3466 717/128 |
| 2011/0072290 A1 | 3/2011 | Davis et al. | |
| 2011/0125955 A1 | 5/2011 | Chen | |
| 2011/0131231 A1 | 6/2011 | Haas et al. | |
| 2011/0167221 A1 | 7/2011 | Pangal et al. | |
| 2012/0023144 A1 | 1/2012 | Rub | |
| 2012/0054264 A1 | 3/2012 | Haugh et al. | |
| 2012/0079318 A1* | 3/2012 | Colgrove | G06F 3/0688 714/6.22 |
| 2012/0131253 A1 | 5/2012 | McKnight et al. | |
| 2012/0215907 A1* | 8/2012 | Chung | G06F 21/552 709/224 |
| 2012/0303919 A1 | 11/2012 | Hu et al. | |
| 2012/0311000 A1 | 12/2012 | Post et al. | |
| 2013/0007845 A1 | 1/2013 | Chang et al. | |
| 2013/0031414 A1 | 1/2013 | Dhuse et al. | |
| 2013/0036272 A1 | 2/2013 | Nelson | |
| 2013/0067288 A1* | 3/2013 | Louie | G06F 11/1443 714/48 |
| 2013/0071087 A1 | 3/2013 | Motiwala et al. | |
| 2013/0073911 A1 | 3/2013 | Terris et al. | |
| 2013/0086429 A1* | 4/2013 | Ng | G06F 11/0748 714/38.1 |
| 2013/0145447 A1 | 6/2013 | Maron | |
| 2013/0191555 A1 | 7/2013 | Liu | |
| 2013/0198459 A1 | 8/2013 | Joshi et al. | |
| 2013/0205173 A1 | 8/2013 | Yoneda | |
| 2013/0219164 A1 | 8/2013 | Hamid | |
| 2013/0227201 A1 | 8/2013 | Talagala et al. | |
| 2013/0283090 A1 | 10/2013 | Bradley et al. | |
| 2013/0290607 A1 | 10/2013 | Chang et al. | |
| 2013/0311434 A1 | 11/2013 | Jones | |
| 2013/0318297 A1 | 11/2013 | Jibbe et al. | |
| 2013/0332614 A1 | 12/2013 | Brunk et al. | |
| 2014/0020083 A1 | 1/2014 | Fetik | |
| 2014/0074850 A1 | 3/2014 | Noel et al. | |
| 2014/0082715 A1 | 3/2014 | Grajek et al. | |
| 2014/0086146 A1 | 3/2014 | Kim et al. | |
| 2014/0090009 A1 | 3/2014 | Li et al. | |
| 2014/0095699 A1* | 4/2014 | Lancaster | G06F 11/0727 709/224 |
| 2014/0096220 A1 | 4/2014 | Da Cruz Pinto et al. | |
| 2014/0101434 A1 | 4/2014 | Senthurpandi et al. | |
| 2014/0149576 A1* | 5/2014 | Pavlov | G06F 11/302 709/224 |
| 2014/0164774 A1 | 6/2014 | Nord et al. | |
| 2014/0173232 A1 | 6/2014 | Reohr et al. | |
| 2014/0195636 A1 | 7/2014 | Karve et al. | |
| 2014/0201512 A1 | 7/2014 | Seethaler et al. | |
| 2014/0201541 A1 | 7/2014 | Paul et al. | |
| 2014/0208155 A1 | 7/2014 | Pan | |

(56) References Cited

U.S. PATENT DOCUMENTS

| | | |
|---|---|---|
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0279918 A1* | 9/2014 | Han ............ G06F 11/366 707/648 |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0006726 A1* | 1/2015 | Yuan ............ H04L 47/70 709/225 |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095488 A1* | 4/2015 | Sutou ............ G06F 11/3409 709/224 |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0134926 A1* | 5/2015 | Yang ............ G06F 3/0611 711/167 |
| 2015/0149822 A1 | 5/2015 | Coronado et al. |
| 2015/0193169 A1 | 7/2015 | Sundaram et al. |
| 2015/0378888 A1 | 12/2015 | Zhang et al. |
| 2016/0077910 A1* | 3/2016 | Dev ............ G06F 11/34 714/4.3 |
| 2016/0098323 A1 | 4/2016 | Mutha et al. |
| 2016/0099844 A1 | 4/2016 | Colgrove et al. |
| 2016/0179711 A1* | 6/2016 | Oikarinen ............ G06F 3/061 710/40 |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2017/0006135 A1* | 1/2017 | Siebel ............ H04L 67/02 |
| 2017/0083390 A1* | 3/2017 | Talwadker ............ G06F 11/079 |
| 2017/0168914 A1* | 6/2017 | Altman ............ G06F 11/3495 |
| 2017/0168917 A1* | 6/2017 | Doi ............ G06F 11/3636 |
| 2017/0310537 A1* | 10/2017 | Henry ............ H04L 41/069 |
| 2017/0371778 A1* | 12/2017 | McKelvie ............ G06F 11/1471 |
| 2018/0004623 A1* | 1/2018 | Krishnamoorthy ............ G06F 11/3034 |

FOREIGN PATENT DOCUMENTS

| | | |
|---|---|---|
| WO | WO 2012/087648 A2 | 6/2012 |
| WO | WO2013071087 A1 | 5/2013 |
| WO | WO 2014/110137 A1 | 7/2014 |
| WO | WO 2016/015008 A1 | 1/2016 |
| WO | WO 2016/190938 A1 | 12/2016 |
| WO | WO 2016/195759 A1 | 12/2016 |
| WO | WO 2016/195958 A1 | 12/2016 |
| WO | WO 2016/195961 A1 | 12/2016 |
| WO | WO-2018/140585 A1 | 8/2018 |

OTHER PUBLICATIONS

The International Search Report and the Written Opinion received from the International Searching Authority (ISA/EP) for International Application No. PCT/US2016/038758, dated Oct. 7, 2016, 10 pages.

The International Search Report and the Written Opinion received from the International Searching Authority (ISA/EP) for International Application No. PCT/US2016/040393, dated Sep. 22, 2016, 10 pages.

The International Search Report and the Written Opinion received from the International Searching Authority (ISA/EP) for International Application No. PCT/US2016/044020, dated Sep. 30, 2016, 11 pages.

Kwok Kong, *Using PCI Express as the Primary System Interconnect in Multiroot Compute, Storage, Communications and Embedded Systems*, IDT, White Paper, <http://www.idt.com/document/whp/idt-pcie-multi-root-white-paper>, retrieved by WIPO Dec. 4, 2014, dated Aug. 28, 2008, 12 pages.

The International Search Report and the Written Opinion received from the International Searching Authority (ISA/EP) for International Application No. PCT/US2016/044874, dated Oct. 7, 2016, 11 pages.

The International Search Report and the Written Opinion received from the International Searching Authority (ISA/EP) for International Application No. PCT/US2016/044875, dated Oct. 5, 2016, 13 pages.

The International Search Report and the Written Opinion received from the International Searching Authority (ISA/EP) for International Application No. PCT/US2016/044876, dated Oct. 21, 2016, 12 pages.

The International Search Report and the Written Opinion received from the International Searching Authority (ISA/EP) for International Application No. PCT/US2016/044877, dated Sep. 29, 2016, 13 pages.

Xiao-Yu Hu et al., *Container Marking: Combining Data Placement, Garbage Collection and Wear Levelling for Flash*, 19th Annual IEEE International Symposium on Modelling, Analysis, and Simulation of Computer and Telecommunications Systems, ISBN: 978-0-7695-4430-4, DOI: 10.1109/MASCOTS.2011.50, dated Jul. 25-27, 2011, 11 pages.

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

Google Search of "storage array define" on Nov. 4, 2015 for U.S. Appl. No. 14/725,278, Results limited to entries dated before 2012, 1 page.

Webopedia. "What is a disk array". Published May 26, 2011. <http://web/archive.org/web/20110526081214/http://www.webopedia.com/TERM/D/disk_array.html>, 2 pages.

Li et al., *Access Control for the Services Oriented Architecture*, Proceedings of the 2007 ACM Workshop on Secure Web Services (SWS '07), Nov. 2007, pp. 9-17, ACM New York, NY.

The International Search Report and the Written Opinion received from the International Searching Authority (ISA/EPO) for International Application No. PCT/US2016/015006, dated Apr. 29, 2016, 12 pages.

The International Search Report and the Written Opinion received from the International Searching Authority (ISA/EPO) for International Application No. PCT/US2016/015008, dated May 4, 2016, 12 pages.

C. Hota et al., *Capability-based Cryptographic Data Access Control in Cloud Computing*, Int. J. Advanced Networking and Applications, col. 1, Issue 1, dated Aug. 2011, 10 pages.

The International Search Report and the Written Opinion received from the International Searching Authority (ISA/EPO) for International Application No. PCT/US2016/020410, dated Jul. 8, 2016, 17 pages.

The International Search Report and the Written Opinion received from the International Searching Authority (ISA/EPO) for International Application No. PCT/US2016/032084, dated Jul. 18, 2016, 12 pages.

Faith, "dictzip file format", GitHub.com (online). [Accessed Jul. 28, 2015], 1 page, URL: https://github.com/fidlej/idzip.

Wikipedia, "Convergent Encryption", Wikipedia.org (online), accessed Sep. 8, 2015, 2 pages, URL: en.wikipedia.org/wiki/Convergent_encryption.

Storer et al., "Secure Data Deduplication", Proceedings of the 4th ACM International Workshop on Storage Security and Survivability (StorageSS'08), Oct. 2008, 10 pages, ACM New York, NY. USA. DOI: 10.1145/1456469.1456471.

The International Search Report and the Written Opinion received from the International Searching Authority (ISA/EPO) for International Application No. PCT/US2016/016333, dated Jun. 8, 2016, 12 pages.

(56) References Cited

OTHER PUBLICATIONS

ETSI, *Network Function Virtualisation (NFV); Resiliency Requirements*, ETSI GS NFCV-REL 001, V1.1.1, http://www.etsi.org/deliver/etsi_gs/NFV-REL/001_099/001/01.01.01_60/gs_NFV-REL001v010101p.pdf (online), dated Jan. 2015, 82 pages.

The International Search Report and the Written Opinion received from the International Searching Authority (ISA/EPO) for International Application No. PCT/US2016/032052, dated Aug. 30, 2016, 17 pages.

Microsoft, "Hybrid for SharePoint Server 2013—Security Reference Architecture", <http://hybrid.office.com/img/Security_Reference_Architecture.pdf> (online), dated Oct. 2014, 53 pages.

Microsoft, "Hybrid Identity", <http://aka.ms/HybridIdentityWp> (online), dated Apr. 2014, 36 pages.

Microsoft, "Hybrid Identity Management", <http://download.microsoft.com/download/E/A/E/EAE57CD1-A80B-423C-96BB-142FAAC630B9/Hybrid_Identity_Datasheet.pdf> (online), published Apr. 2014, 17 pages.

Jacob Bellamy-McIntyre et al., "OpenID and the Enterprise: A Model-based Analysis of Single Sign-On Authentication", 2011 15th IEEE International Enterprise Distributed Object Computing Conference (EDOC), DOI: 10.1109/EDOC.2011.26, ISBN: 978-1-4577-0362-1, <https://www.cs.auckland.ac.nz/~lutteroth/publications/McIntyreLutterothWeber2011-OpenID.pdf> (online), dated Aug. 29, 2011, 10 pages.

The International Search Report and the Written Opinion received from the International Searching Authority (ISA/EPO) for International Application No. PCT/US2016/035492, dated Aug. 17, 2016, 10 pages.

PCMAG, *Storage Array Definition*, Published May 10, 2013. <http://web.archive.org/web/20130510121646/http://www.pcmag.com/encyclopedia/term/52091/storage-array>, 2 pages.

Techopedia, *What is a disk array*, techopedia.com (online), Jan. 13, 2012, 1 page, URL: web.archive.org/web/20120113053358/http://www.techopedia.com/definition/1009/disk-array.

International Search Report and Written Opinion, PCTUS2018015202, dated May 3, 2018, 12 pages.

\* cited by examiner

DYNAMICALLY ADJUSTING AN AMOUNT OF LOG DATA GENERATED FOR A STORAGE SYSTEM

DESCRIPTION OF EMBODIMENTS

Figure 1:
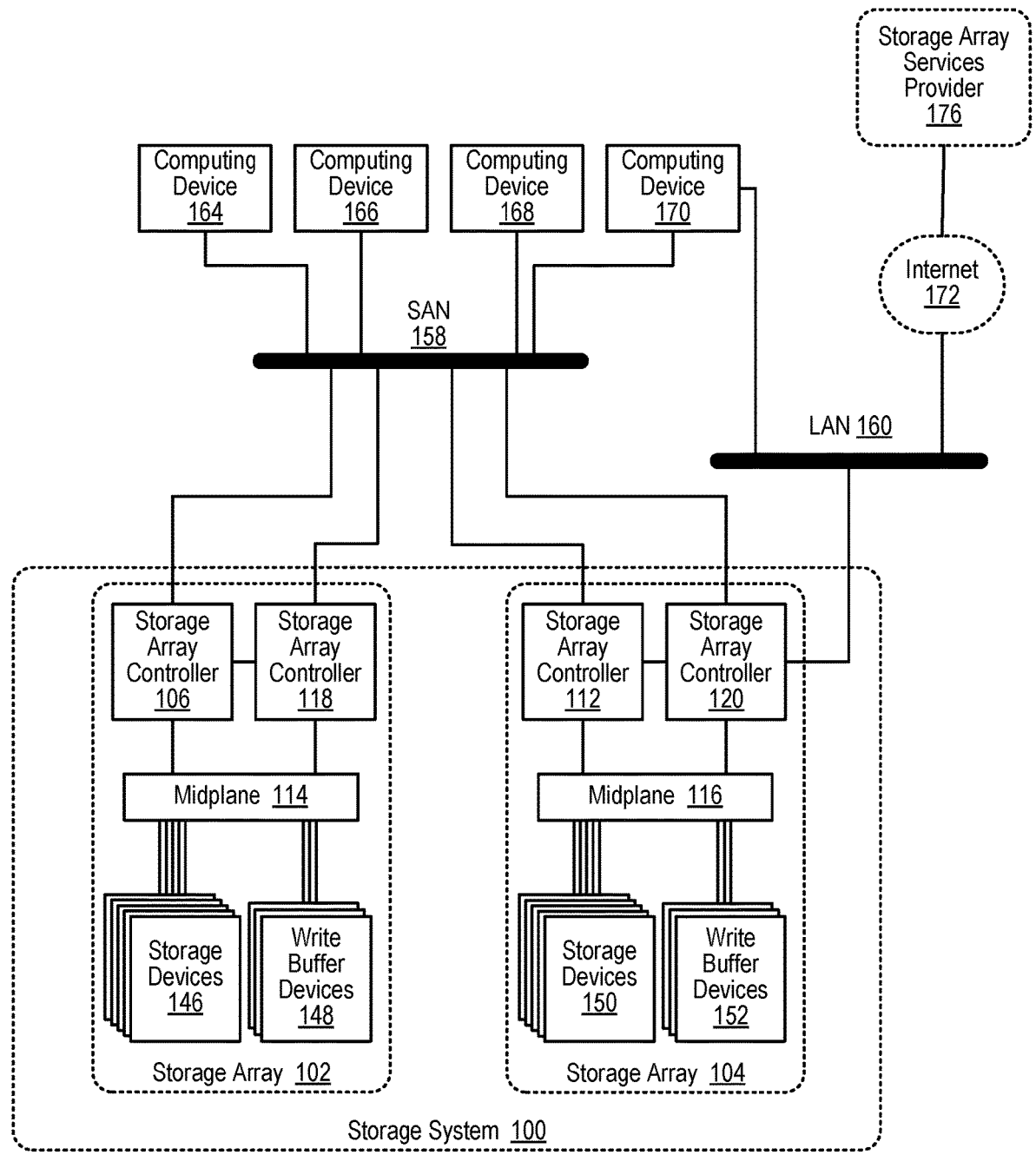
FIG. 1 sets forth a block diagram of a storage system configured for dynamically adjusting an amount of log data generated according to some embodiments of the present disclosure.

Example methods, apparatus, and products for dynamically adjusting an amount of log data generated for a storage system in accordance with the present disclosure are described with reference to the accompanying drawings, beginning with FIG. 1. FIG. 1 sets forth a block diagram of a storage system (100) configured for dynamically adjusting an amount of log data generated according to some embodiments of the present disclosure.

The storage system (100) depicted in FIG. 1 includes a plurality of storage arrays (102, 104), although dynamically adjusting an amount of log data generated in accordance with embodiments of the present disclosure may be carried out in storage systems that include only a single storage array. Each storage array (102, 104) may be embodied as a collection of computer hardware devices that provide persistent data storage to users of the storage system (100). Each storage array (102, 104) may include a collection of data storage devices that are mounted within one or more chassis, racks, or other enclosure. Although not expressly depicted in FIG. 1, each storage array (102, 104) may include a plurality of power supplies that deliver power to one or more components within the storage system (100) via a power bus, each storage array (102, 104) may include a plurality of data communications networks that enables one or more components within the storage system (100) to communicates, each storage array (102, 104) may include a plurality of cooling components that are used to cool one or more components within the storage system (100), and so on.

The example storage arrays (102, 104) depicted in FIG. 1 may provide persistent data storage for computing devices (164, 166, 168, 170) that are coupled to the storage system (100) via one or more data communications networks. Each of the computing devices (164, 166, 168, 170) depicted in FIG. 1 may be embodied, for example, as a server, a workstation, a personal computer, a notebook, a smartphone, a tablet computer, or the like. The computing devices (164, 166, 168, 170) in the example of FIG. 1 are coupled for data communications to the storage arrays (102, 104) through a storage area network ('SAN') (158). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, small computer system interface ('SCSI'), iSCSI, HyperSCSI, and others. Readers will appreciate that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The computing devices (164, 166, 168, 170) depicted in FIG. 1 are also coupled for data communications to the storage arrays (102, 104) through a local area network (160) ('LAN'). The LAN (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Real Time Protocol ('RTP') and others as will occur to those of skill in the art. The LAN (160) depicted in FIG. 1 may be coupled to other computing devices not illustrated in FIG. 1, for example, via the Internet (172). Although only one storage array (104) is expressly depicted as being coupled to the computing devices (164, 166, 168, 170) via the LAN (160), readers will appreciate that other storage arrays (102) in the storage system (100) may also be coupled to the computing devices (164, 166, 168, 170) via the same LAN (160) or via a different LAN.

In addition to being coupled to the computing devices through the SAN (158) and the LAN (160), the storage arrays may also be coupled to one or more cloud service providers, for example, through the Internet (172) or through another data communications network. One example cloud service in FIG. 1 is a storage array services provider (176). The storage array service provider (176) may be configured to provide various storage array services such as reporting of storage array performance characteristics, configuration control of the storage arrays, analyzing log data generated by a storage system, and the like. The storage array services provider may rely on modules executing on the storage array itself to gather such data.

Each storage array (102, 104) depicted in FIG. 1 includes a plurality of storage array controllers (106, 112, 118, 120). Each storage array controller (106, 112, 118, 120) may be embodied as a module of automated computing machinery comprising computer hardware, computer software, or a combination of computer hardware and software. Each storage array controller (106, 112, 118, 120) may be configured to carry out various storage-related tasks such as, for example, writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112, 118, 120) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112, 118, 120) may include, for example, a data communications adapter configured to support communications via the SAN (158) and the LAN (160). Although only one of the storage array controllers (120) in the example of FIG. 1 is depicted as being coupled to the LAN (160) for data communications, readers will appreciate that each storage array controller (106, 112, 118, 120) may be independently coupled to the LAN (160). Each storage array controller (106, 112, 118, 120) may also include, for example, an I/O controller or the like that couples the storage array controller (106, 112, 118, 120) for data communications, through a midplane (114, 116), to a number of storage devices (146, 150), and a number of write buffer devices (148, 152) that are utilized as write caches.

In the example depicted in FIG. 1, the presence of multiple storage array controllers (106, 112, 118, 120) in each storage array (102, 104) can enable each storage array (102, 104) to be highly available as there are independent, redundant storage array controllers (106, 112, 118, 120) that are capable of servicing access requests (e.g., reads, writes) to the storage arrays (102, 104). In some embodiments, each storage array controller (106, 112, 118, 120) in a particular storage array (102, 104) may appear to be active to the computing devices (164, 166, 168, 170) as each storage array controller (106, 112, 118, 120) may be available for receiving requests to access the storage array (102, 104) from the computing devices (164, 166, 168, 170) via the SAN (158) or LAN (160). Although storage array controller (106, 112, 118, 120) may be available for receiving requests to access the storage array (102, 104), however, in some embodiments only one storage array controller (106, 112, 118, 120) may actively be allowed to direct access requests to the storage devices (146, 150) or write buffer devices (148, 152). For ease of explanation, a storage array controller that is allowed to direct access requests to the storage devices (146, 150) or write buffer devices (148, 152) may be referred to herein as an 'active' storage array controller whereas a storage array controller that is not allowed to direct access requests to the storage devices (146, 150) or write buffer devices (148, 152) may be referred to herein as a 'passive' storage array controller. Readers will appreciate that because a passive storage array controller may still receive requests to access the storage array (102, 104) from the computing devices (164, 166, 168, 170) via the SAN (158) or LAN (160), the passive storage array controller may be configured to forward any access requests received by the passive storage array controller to the active storage array controller.

Consider an example in which a first storage array controller (106) in a first storage array (102) is the active storage array controller that is allowed to direct access requests to the storage devices (146) or write buffer devices (148) within the first storage array (102), while a second storage array controller (118) in the first storage array (102) is the passive storage array controller that is not allowed to direct access requests to the storage devices (146) or write buffer devices (148) within the first storage array (102). In such an example, the second storage array controller (118) may continue to receive access requests from the computing devices (164, 166, 168, 170) via the SAN (158) or LAN (160). Upon receiving access requests from the computing devices (164, 166, 168, 170), the second storage array controller (118) may be configured to forward such access requests to the first storage array controller (106) via a communications link between the first storage array controller (106) and the second storage array controller (118). Readers will appreciate that such an embodiment may reduce the amount of coordination that must occur between the first storage array controller (106) and the second storage array controller (118) relative to an embodiment where both storage array controllers (106, 118) are allowed to simultaneously modify the contents of the storage devices (146) or write buffer devices (148).

Although the example described above refers to an embodiment where the first storage array controller (106) is the active storage array controller while the second storage array controller (118) is the passive storage array controller, over time such designations may switch back and forth. For example, an expected or unexpected event may occur that results in a situation where the first storage array controller (106) is the passive storage array controller while the second storage array controller (118) is the active storage array controller. An example of an unexpected event that could cause a change in the roles of each storage array controller (106, 118) is the occurrence of a failure or error condition with the first storage array controller (106) that causes the storage array (102) to fail over to the second storage array controller (118). An example of an expected event that could cause a change in the roles of each storage array controller (106, 118) is the expiration of a predetermined period of time, as the first storage array controller (106) may be responsible for interacting with the storage devices (146) and the write buffer devices (148) during a first time period while the second storage array controller (118) may be responsible for interacting with the storage devices (146) and the write buffer devices (148) during a second time period. Readers will appreciate that although the preceding paragraphs describe active and passive storage array controllers with reference to the first storage array (102), the storage array controllers (112, 120) that are part of other storage arrays (104) in the storage system (100) may operate in a similar manner.

Each storage array (102, 104) depicted in FIG. 1 includes one or more write buffer devices (148, 152). Each write buffer device (148, 152) may be configured to receive, from the one of the storage array controller (106, 112, 118, 120), data to be stored in one or more of the storage devices (146, 150). In the example of FIG. 1, writing data to the write buffer device (148, 152) may be carried out more quickly than writing data to the storage device (146, 150). The storage array controllers (106, 112, 118, 120) may therefore be configured to effectively utilize the write buffer devices (148, 152) as a quickly accessible buffer for data destined to be written to one or the storage devices (146, 150). By utilizing the write buffer devices (148, 152) in such a way, the write latency experienced by users of the storage system (100) may be significantly improved relative to storage systems that do not include such write buffer devices (148, 152). The write latency experienced by users of the storage system (100) may be significantly improved relative to storage systems that do not include such write buffer devices (148, 152) because the storage array controllers (106, 112, 118, 120) may send an acknowledgment to the user of the storage system (100) indicating that a write request has been serviced once the data associated with the write request has been written to one or the write buffer devices (148, 152), even if the data associated with the write request has not yet been written to any of the storage devices (146, 150).

The presence of the write buffer devices (148, 152) may also improve the utilization of the storage devices (146, 150) as a storage array controller (106, 112, 118, 120) can accumulate more writes and organize writing to the storage devices (146, 150) for greater efficiency. Greater efficiency can be achieved, for example, as the storage array controller (106, 112, 118, 120) may have more time to perform deeper compression of the data, the storage array controller (106, 112, 118, 120) may be able to organize the data into write blocks that are in better alignment with the underlying physical storage on the storage devices (146, 150), the storage array controller (106, 112, 118, 120) may be able to perform deduplication operations on the data, and so on. Such write buffer devices (148, 152) effectively convert storage arrays of solid-state drives (e.g., "Flash drives") from latency limited devices to throughput limited devices. In such a way, the storage array controller (106, 112, 118, 120) may be given more time to better organize what is written to the storage devices (146, 150), but after doing so, are not then mechanically limited like disk-based arrays are.

Each storage array (102, 104) depicted in FIG. 1 includes one or more storage devices (146, 150). A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, solid-state drives, and the like.

The storage array controllers (106, 112) of FIG. 1 may be useful in dynamically adjusting an amount of log data generated for a storage system according to some embodiments of the present disclosure. The storage array controllers (106, 112) may assist in dynamically adjusting an amount of log data generated for a storage system by: setting, for a component within the storage system, a logging level for the component, the logging level specifying the extent to which log data should be generated for a particular component; determining, in dependence upon one or more measured operating characteristics of the storage system, whether the logging level for the component should be changed; and responsive to determining that the logging level for the component should be changed, changing the logging level associated with the component; as well as performing other functions as will be described in greater detail below.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Dynamically adjusting an amount of log data generated for a storage system in accordance with embodiments of the present disclosure is generally implemented with computers. In the system of FIG. 1, for example, all the computing devices (164, 166, 168, 170) and storage controllers (106, 112, 118, 120) may be implemented to some extent at least as computers. For further explanation, therefore, FIG. 2 sets forth a block diagram of a storage array controller (202) useful in dynamically adjusting an amount of log data generated for a storage system according to some embodiments of the present disclosure.

Figure 2:
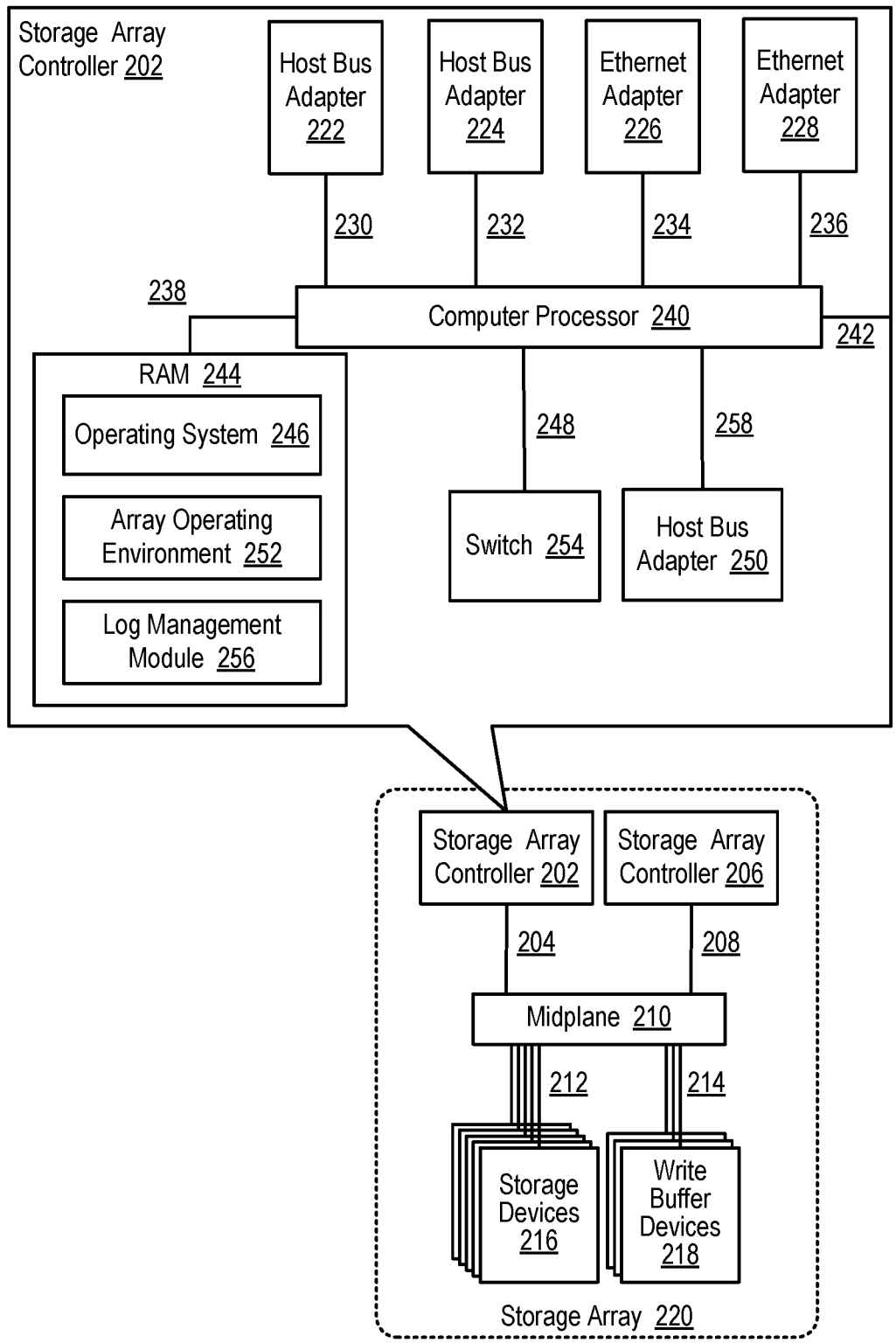
FIG. 2 sets forth a block diagram of a storage array controller useful in dynamically adjusting an amount of log data generated for a storage system according to some embodiments of the present disclosure.

The storage array controllers (202, 206) depicted in FIG. 2 may be similar to the storage array controllers depicted in FIG. 1, as the storage array controllers (202, 206) of FIG. 2 may be communicatively coupled, via a midplane (210), to one or more storage devices (216) and to one or more write buffer devices (218) that are included as part of a storage array (220). The storage array controllers (202, 206) may be coupled to the midplane (210) via one or more data communications links (204, 208) and the midplane (206) may be coupled to the storage devices (216) and the memory buffer devices (218) via one or more data communications links (212, 214). The data communications links (204, 208, 212, 214) of FIG. 2 may be embodied, for example, as a Peripheral Component Interconnect Express ('PCIe') bus, as a Serial Attached SCSI ('SAS') data communications link, and so on. Although only one of the storage array controllers (202) is depicted in detail, readers will appreciate that other storage array controllers (206) may include similar components. For ease of explanation, however, the detailed view of one of the storage array controllers (202) will be described below.

The storage array controller (202) detailed in FIG. 2 can include at least one computer processor (240) or 'CPU' as well as random access memory ('RAM') (244). The computer processor (240) may be connected to the RAM (244) via a data communications link (238), which may be embodied as a high speed memory bus such as a Double-Data Rate 4 ('DDR4') bus. Although the storage array controller (202) detailed in FIG. 2 includes only a single computer processor, however, readers will appreciate that storage array controllers useful in dynamically adjusting an amount of log data generated for a storage system according to some embodiments of the present disclosure may include additional computer processors. Likewise, although the storage array controller (202) detailed in FIG. 2 includes only a RAM (244), readers will appreciate that storage array controllers useful in dynamically adjusting an amount of log data generated for a storage system according to some embodiments of the present disclosure may include additional forms of computer memory such as flash memory.

The storage array controller (202) detailed in FIG. 2 includes an operating system (246) that is stored in RAM (246). Examples of operating systems useful in storage array controllers (202, 206) configured for [dynamically adjusting an amount of log data generated for a storage system according to some embodiments of the present disclosure include UNIX™, Linux™ Microsoft Windows™, and others as will occur to those of skill in the art. The operating system (246) depicted in FIG. 2 may be embodied, for example, as system software that manages computer hardware and software resources on the storage array controller (202).

The storage array controller (202) detailed in FIG. 2 also includes an array operating environment (252) that is stored in RAM (252). The array operating environment (252) may be embodied as one or more modules of computer program instructions used to enable the storage array controller (202) to service access requests that are directed to the storage array (220). The array operating environment (252) may be responsible for generating I/O requests (e.g., read requests, write requests) that are sent to the storage devices (216) or the write buffer devices (218). The array operating environment (252) may be further configured to perform various functions that result in more efficient utilization of the resources within the storage array (220). The array operating environment (252) may be configured, for example, to compress data prior to writing the data to one of the storage devices (216), to perform data deduplication operations, to pool data that is to be written to one of the storage devices (216) so that data may be written in blocks of a predetermined size, and so on.

The storage array controller (202) detailed in FIG. 2 also includes a log management module (256), a module that includes computer program instructions useful in dynamically adjusting an amount of log data generated for a storage system according to some embodiments of the present disclosure. The log management module (256) may include computer program instructions that, when executed, cause the storage array controller (202) to set, for a component within the storage system, a logging level for the component, the logging level specifying the extent to which log data should be generated for a particular component; determine, in dependence upon one or more measured operating characteristics of the storage system, whether the logging level for the component should be changed; change the logging level associated with the component in response to determining that the logging level for the component should be changed; and perform other functions as will be described in greater detail below.

The storage array controller (202) detailed in FIG. 2 also includes a plurality of host bus adapters (222, 224, 250) and Ethernet adapters (226, 228) that are coupled to the computer processor (240) via a data communications link (230, 232, 236, 238, 258). Each host bus adapter (222, 224, 250) may be embodied as a module of computer hardware that connects the host system (i.e., the storage array controller) to other network and storage devices. Each of the host bus adapters (222, 224, 250) of FIG. 2 may be embodied, for example, as a Fibre Channel adapter that enables the storage array controller (202) to connect to a SAN, as an Ethernet adapter that enables the storage array controller (202) to connect to a LAN, as a Target Channel Adapter, as a SCSI/Storage Target Adapter, and so on. Each of the host bus adapters (222, 224, 250) may be coupled to the computer processor (240) via a data communications link (230, 232, 258) such as, for example, a PCIe bus.

The storage array controller (202) detailed in FIG. 2 also includes a switch (254) that is coupled to the computer processor (240) via a data communications link (248). The switch (254) of FIG. 2 may be embodied as a computer hardware device that can create multiple endpoints out of a single endpoint, thereby enabling multiple devices to share what was initially a single endpoint. The switch (254) of FIG. 2 may be embodied, for example, as a PCIe switch that is coupled to a PCIe bus and presents multiple PCIe connection points to the midplane (210).

The storage array controller (202) of FIG. 2 may also include a data communications link (242) for coupling the storage array controller (202) to other storage array controllers (206). Such a data communications link (242) may be embodied, for example, as a QuickPath Interconnect ('QPI') interconnect, as PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
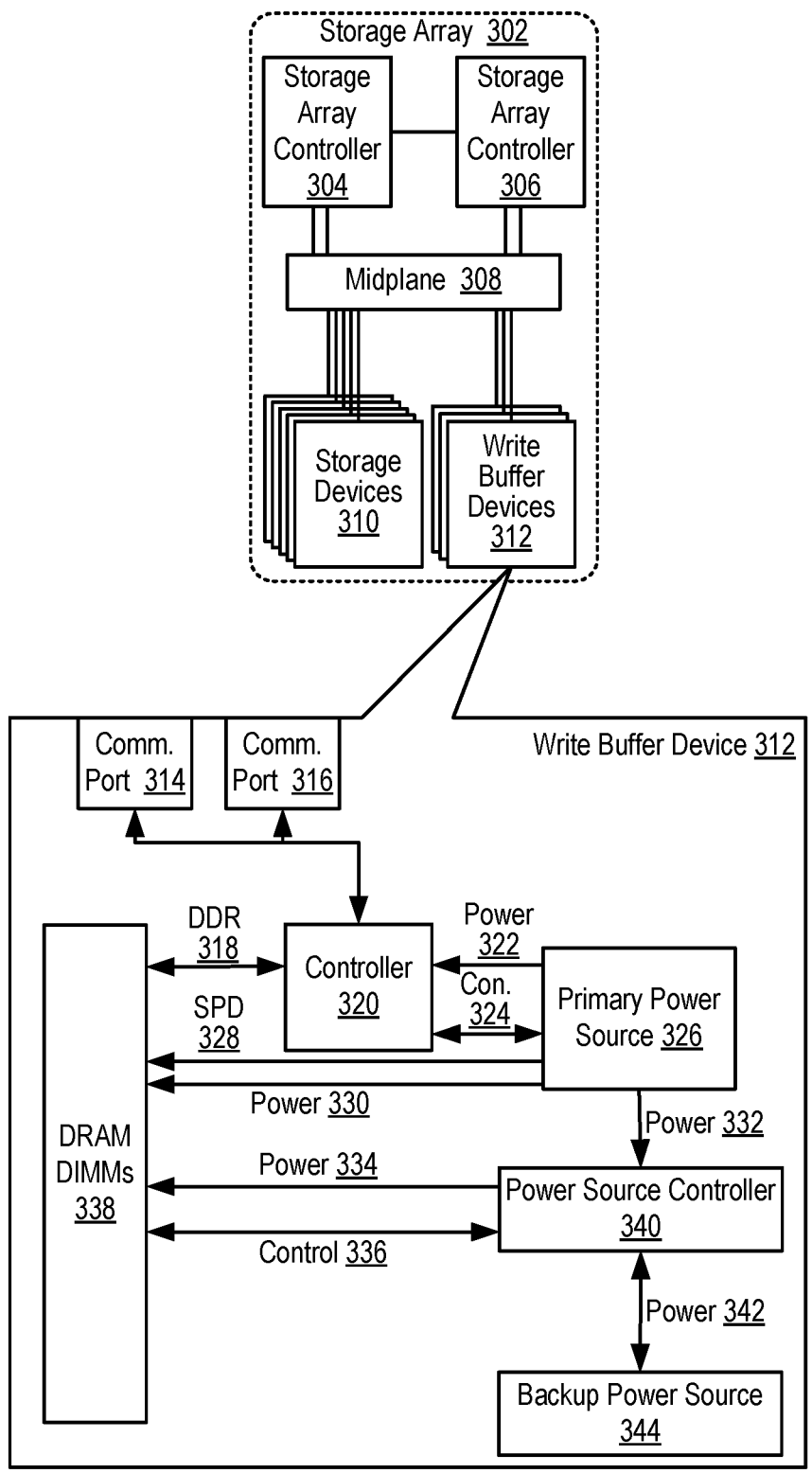
FIG. 3 sets forth a block diagram illustrating a write buffer device useful in storage systems configured for dynamically adjusting an amount of log data generated according to some embodiments of the present disclosure.

For further explanation, FIG. 3 sets forth a block diagram illustrating a write buffer device (312) useful in storage systems configured for dynamically adjusting an amount of log data generated according to some embodiments of the present disclosure. The write buffer device (312) depicted in FIG. 3 is similar to the write buffer devices depicted in FIG. 1 and FIG. 2. The write buffer device (312) may be included in a storage array (302) that includes a plurality of storage array controllers (304, 306) that are communicatively coupled to a plurality of storage devices (310) and also communicatively coupled to a plurality of write buffer devices (312) via a midplane (308).

The write buffer device (312) depicted in FIG. 3 includes two data communications ports (314, 316). The data communications ports (314, 316) of FIG. 3 may be embodied, for example, as computer hardware for communicatively coupling the write buffer device (312) to a storage array controller (304, 306) via the midplane (308). For example, the write buffer device (312) may be communicatively coupled to the first storage array controller (304) via a first data communications port (314) and the write buffer device (312) may also be communicatively coupled to the second storage array controller (306) via a second data communications port (316). Although the write buffer device (312) depicted in FIG. 3 includes two data communications ports (314, 316), readers will appreciate that write buffer devices useful for buffering data to be written to an array of non-volatile storage devices may include only one data communications port or, alternatively, additional data communications ports not depicted in FIG. 3.

The write buffer device (312) depicted in FIG. 3 also includes a controller (320). The controller (320) depicted in FIG. 3 may be embodied, for example, as computer hardware for receiving memory access requests (e.g., a request to write data to memory in the write buffer device) via the data communications ports (314, 316) and servicing such memory access requests. The controller (320) depicted in FIG. 3 may be embodied, for example, as an ASIC, as a microcontroller, and so on. The controller (320) depicted in FIG. 3 may be communicatively coupled the data communications ports (314, 316), for example, via a PCIe data communications bus.

The write buffer device (312) depicted in FIG. 3 also includes a plurality of DRAM memory modules, embodied in FIG. 3 as DRAM dual in-line memory modules ('DIMMs') (338). The DRAM DIMMs (338) depicted in FIG. 3 may be coupled to the controller (320) via a memory bus such as a DDR (318) memory bus such that the controller (320) can be configured to write data to the DRAM DIMMs (338) via the DDR (318) memory bus.

The write buffer device (312) depicted in FIG. 3 also includes a primary power source (326). The primary power source (326) may be embodied as computer hardware for providing electrical power to the computing components that are within the write buffer device (312). The primary power source (326) may be embodied, for example, as a switched-mode power supply that supplies electric energy to an electrical load by converting alternating current ('AC') power from a mains supply to a direct current ('DC') power, as a DC-to-DC converter that converts a source of direct current (DC) from one voltage level to another, and so on. The primary power source (326) of FIG. 3 is coupled to the controller (320) via a power line (322) that the primary power source (326) can use to deliver power to the controller (320). The primary power source (326) of FIG. 3 is also coupled to the DRAM DIMMs (338) via a power line (330) that the primary power source (326) can use to deliver power to the DRAM DIMMs (338). The primary power source (326) of FIG. 3 is also coupled to a power source controller (340) via a power line (332) that the primary power source (326) can use to deliver power to the power source controller (340). The primary power source (326) can monitor which components are receiving power through the use of one or more control lines (324), serial presence detect ('SPD') lines (328), or other mechanism for detecting the presence of a device and detecting that power is being provided to the device. Readers will appreciate that write devices useful for buffering data to be written to an array of non-volatile storage devices may include additional computing components not depicted in FIG. 3, each of which may also receive power from the primary power source (326).

The write buffer device (312) depicted in FIG. 3 also includes a backup power source (344). The backup power source (344) depicted in FIG. 3 represents a power source capable of providing power to the DRAM DIMMs (338) in the event that the primary power source (326) fails. In such a way, the DRAM DIMMs (338) may effectively serve as non-volatile memory, as a failure of the primary power source (326) will not cause the contents of the DRAM DIMMs (338) to be lost because the DRAM DIMMs (338) will continue to receive power from the backup power source (344). Such a backup power source (344) may be embodied, for example, as a supercapacitor.

The write buffer device (312) depicted in FIG. 3 also includes a power source controller (340). The power source controller (340) depicted in FIG. 3 may be embodied as a module of computer hardware configured to identify a failure of the primary power source (326) and to cause power to be delivered to the DRAM DIMMs (338) from the backup power source (344). In such an example, power may be delivered to the DRAM DIMMs (338) from the backup power source (344) via a first power line (342) between the power source controller (340) and the backup power source (344), as well as a second power line (334) between the backup power source controller (340) and the DRAM DIMMs (338). The backup power source controller (340) depicted in FIG. 3 may be embodied, for example, as an analog circuit, an ASIC, a microcontroller, and so on. The power source controller (340) can monitor whether the DRAM DIMMs (338) have power through the use of one or more control lines (336) that may be coupled to the DRAM DIMMs (338), as well as one or more control lines that may be coupled to the primary power source (326). In such an example, by exchanging signals between the DRAM DIMMs (338), the primary power source (326), and the power source controller (340), the power source controller (340) may identify whether power is being provided to the DRAM DIMMs (338) by the primary power source (326).

In the example depicted in FIG. 3, the controller (320) may be configured to receive, from a storage array controller (304, 306) via the one or more data communications ports (314, 316), an instruction to write data to the one or more DRAM DIMMs (338). Such an instruction may include, for example, the location at which to write the data, the data to be written to the DRAM DIMMs (338), the identity of the host that issued the instruction, the identity of a user associated with the instruction, or any other information needed to service the instruction. In the example depicted in FIG. 3, the NVRAM controller (320) may be further configured to write the data to the one or more DRAM DIMMs (338) in response to receiving such an instruction.

In the example depicted in FIG. 3, the controller (320) may be further configured to send an acknowledgment indicating that the data has been written to the array (302) of non-volatile storage devices in response to writing the data to the one or more DRAM DIMMs (338). The controller (320) may send the acknowledgment indicating that the data has been written to the array (302) of non-volatile storage devices in response to writing the data to the DRAM DIMMs (338) in the write buffer device (312). Readers will appreciate that although some forms of DRAM DIMMs (338) are considered to be volatile memory, because the DRAM DIMMs (338) are backed by redundant power sources (326, 344), writing the data to the DRAM DIMMs (338) in the write buffer device (312) may be treated the same as writing the data to traditional forms of non-volatile memory such as the storage devices (310). Furthermore, the DRAM DIMMs (338) in the write buffer device (312) can include one or more NVDIMMs. As such, once the data has been written to the DRAM DIMMs (338) in the write buffer device (312), an acknowledgement may be sent indicating that the data has been safely and persistently written to the array (302) of non-volatile storage devices.

In the example depicted in FIG. 3, the controller (320) may be further configured to determine whether the primary power source (326) has failed. The controller (320) may determine whether the primary power source (326) has failed, for example, by receiving a signal over the control line (324) indicating that the primary power source (326) has failed or is failing, by detecting a lack of power from the primary power source (326), and so on. In such an example, the controller (320) may be coupled to the backup power source (344) or may have access to another source of power such that the controller (320) can remain operational if the primary power source (326) does fail.

In the example depicted in FIG. 3, the controller (320) may be further configured to initiate a transfer of data contained in the one or more DRAM DIMMs (338) to flash memory in the write buffer device (312) in response to determining that the primary power source (326) has failed. The controller (320) may initiate a transfer of data contained in the one or more DRAM DIMMs (338) to flash memory in the write buffer device (312), for example, by signaling an NVDIMM to write the data contained in the one or more DRAM DIMMs (338) to flash memory on the NVDIMM, by reading the data contained in the one or more DRAM DIMMs (338) and writing such data to flash memory in the write buffer device (312), or in other ways.

The embodiments below describe a storage cluster that stores user data, such as user data originating from one or more user or client systems or other sources external to the storage cluster. The storage cluster can distribute user data across storage nodes housed within a chassis, for example, using erasure coding and redundant copies of metadata. Erasure coding refers to a method of data protection or reconstruction in which data is stored across a set of different locations, such as disks, storage nodes, geographic locations, and so on. Flash memory is one type of solid-state memory that may be integrated with the embodiments, although the embodiments may be extended to other types of solid-state memory or other storage medium, including non-solid state memory. Control of storage locations and workloads may be distributed across the storage locations in a clustered peer-to-peer system. Tasks such as mediating communications between the various storage nodes, detecting when a storage node has become unavailable, and balancing I/Os (inputs and outputs) across the various storage nodes, may all be handled on a distributed basis. Data may be laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes may be included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are suitable. The chassis can provide a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as NFS, common internet file system (CIFS), SCSI, HTTP, or other suitable interface. Translation from the client protocol may occur at the switch, chassis external communication bus or within each storage node.

Each storage node may be one or more storage servers and each storage server may be connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM, and interfaces for the internal communication bus and power distribution for each of the power buses. Inside the storage node, the interfaces and storage unit may share a communication bus, e.g., PCI Express, in some embodiments. The non-volatile solid state memory units may directly access the internal communication bus interface through a storage node communication bus, or request the storage node to access the bus interface. The non-volatile solid state memory unit may contain an embedded CPU, solid state storage controller, and a quantity of solid state mass storage, e.g., between 2-32 terabytes (TB) in some embodiments. An embedded volatile storage medium, such as DRAM, and an energy reserve apparatus may be included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM) that substitutes for DRAM and enables a reduced power hold-up apparatus.

One of many features of the storage nodes and non-volatile solid state storage may be the ability to proactively rebuild data in a storage cluster. The storage nodes and non-volatile solid state storage may be able to determine when a storage node or non-volatile solid state storage in the storage cluster is unreachable, independent of whether there is an attempt to read data involving that storage node or non-volatile solid state storage. The storage nodes and non-volatile solid state storage may then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 4:
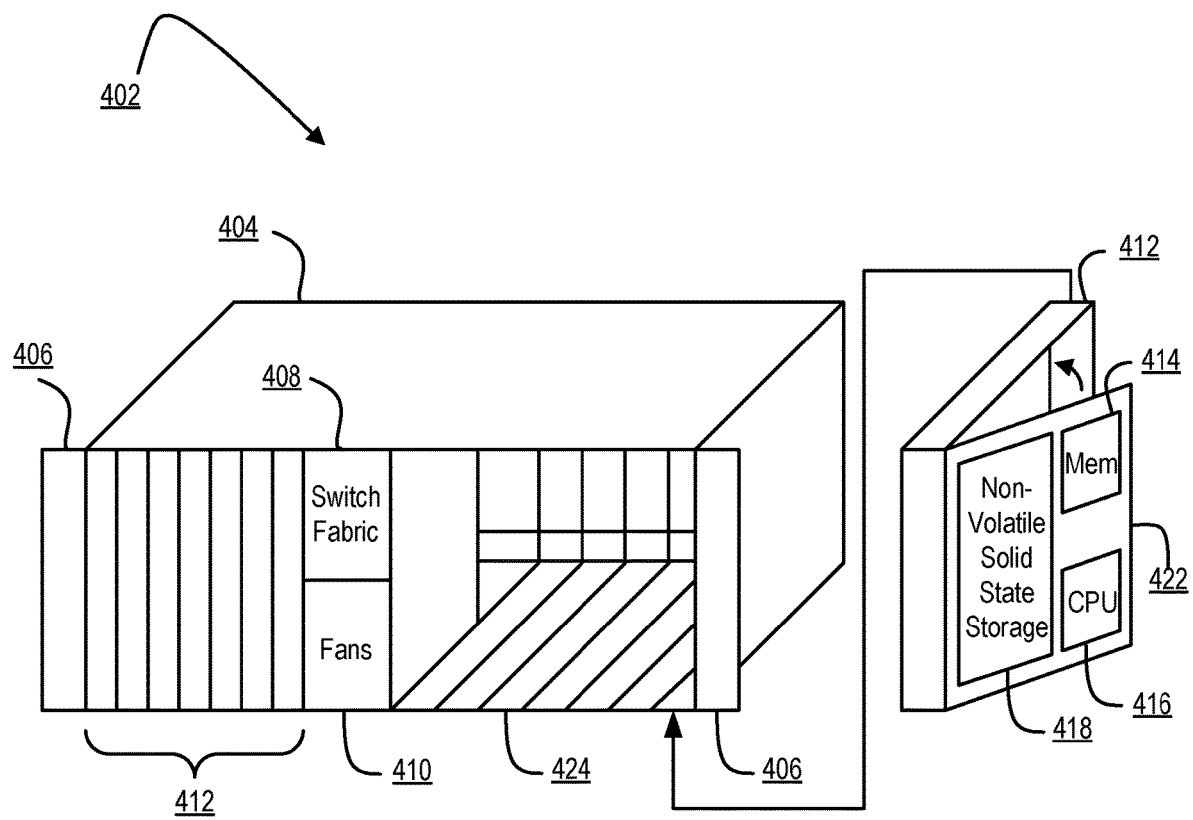
FIG. 4 illustrates a perspective view of a storage cluster with multiple storage nodes and internal solid-state memory coupled to each storage node to provide network attached storage or storage area network in accordance with some embodiments of the present disclosure.

FIG. 4 illustrates a perspective view of a storage cluster (402), with multiple storage nodes (412) and internal solid-state memory coupled to each storage node to provide network attached storage or storage area network, in accordance with some embodiments. A network attached storage, storage area network, or a storage cluster, or other storage memory, could include one or more storage clusters (402), each having one or more storage nodes (412), in a flexible and reconfigurable arrangement of both the physical components and the amount of storage memory provided thereby. The storage cluster (402) may be designed to fit in a rack, and one or more racks can be set up and populated as desired for the storage memory. The storage cluster (402) may include a chassis (404) having multiple slots (424). It should be appreciated that chassis (404) may be referred to as a housing, enclosure, or rack unit. In one embodiment, the chassis (404) has fourteen slots (424), although other numbers of slots are readily devised. For example, some embodiments have four slots, eight slots, sixteen slots, thirty-two slots, or other suitable number of slots. Each slot (424) can accommodate one storage node (412) in some embodiments. The chassis (404) may include flaps (406) that can be utilized to mount the chassis (404) on a rack. Fans (410) may provide air circulation for cooling of the storage nodes (412) and components thereof, although other cooling components could be used, or an embodiment could be devised without cooling components. A switch fabric (408) may couple storage nodes (412) within chassis (404) together and to a network for communication to the memory. In an embodiment depicted in FIG. 4, the slots (424) to the left of the switch fabric (408) and fans (410) are shown occupied by storage nodes (1012), while the slots (424) to the right of the switch fabric (408) and fans (410) are empty and available for insertion of storage node (412) for illustrative purposes. This configuration is one example, and one or more storage nodes (412) could occupy the slots (424) in various further arrangements. The storage node arrangements need not be sequential or adjacent in some embodiments. Storage nodes (412) may be hot pluggable, meaning that a storage node (412) can be inserted into a slot (424) in the chassis (404), or removed from a slot (424), without stopping or powering down the system. Upon insertion or removal of a storage node (412) from a slot (424), the system may automatically reconfigure in order to recognize and adapt to the change. Reconfiguration, in some embodiments, includes restoring redundancy and/or rebalancing data or load.

Each storage node (412) can have multiple components. In the embodiment shown here, the storage node (412) includes a printed circuit board (422) populated by a CPU (416), i.e., processor, a memory (414) coupled to the CPU (416), and a non-volatile solid state storage (418) coupled to the CPU (416), although other mountings and/or components could be used in further embodiments. The memory (414) may include instructions which are executed by the CPU (416) and/or data operated on by the CPU (416). As further explained below, the non-volatile solid state storage (418) may include flash or, in further embodiments, other types of solid-state memory.

Referring to FIG. 4, the storage cluster (402) may be scalable, meaning that storage capacity with non-uniform storage sizes may be readily added, as described above. One or more storage nodes (412) can be plugged into or removed from each chassis and the storage cluster self-configures in some embodiments. Plug-in storage nodes (412), whether installed in a chassis as delivered or later added, can have different sizes. For example, in one embodiment a storage node (412) can have any multiple of 4 TB, e.g., 8 TB, 12 TB, 16 TB, 32 TB, etc. In further embodiments, a storage node (412) could have any multiple of other storage amounts or capacities. Storage capacity of each storage node (412) may be broadcast, and may influence decisions of how to stripe the data. For maximum storage efficiency, an embodiment can self-configure as wide as possible in the stripe, subject to a predetermined requirement of continued operation with loss of up to one, or up to two, non-volatile solid state storage (418) units or storage nodes (412) within the chassis.

Figure 5:
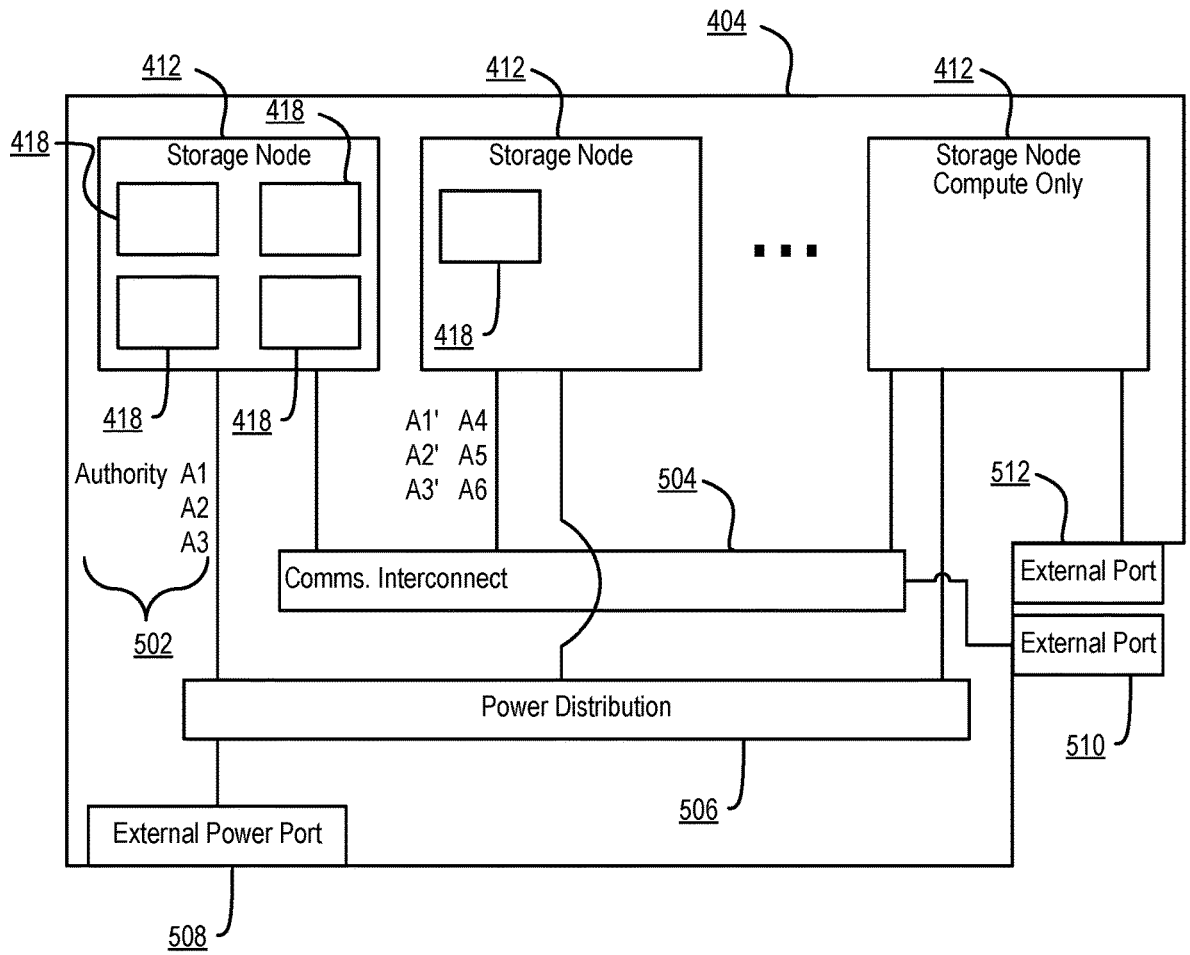
FIG. 5 illustrates a block diagram showing a communications interconnect (504) and power distribution bus coupling multiple storage nodes according to some embodiments of the present disclosure.

FIG. 5 illustrates a block diagram showing a communications interconnect (504) and power distribution bus (506) coupling multiple storage nodes (412) according to some embodiments of the present disclosure. Referring back to FIG. 4, the communications interconnect (504) can be included in or implemented with the switch fabric (408) in some embodiments. Where multiple storage clusters occupy a rack, the communications interconnect (504) can be included in or implemented with a top of rack switch, in some embodiments. In the example depicted in FIG. 5, the storage cluster may be enclosed within a single chassis (404). An external port (510) may be coupled to storage nodes (412) through the communications interconnect (504), while another external port (512) may be coupled directly to a storage node (412). An external power port (508) may be coupled to a power distribution bus (506). The storage nodes (412) may include varying amounts and differing capacities of non-volatile solid state storage (418) as described with reference to FIG. 4. In addition, one or more storage nodes (412) may be a compute only storage node as illustrated in FIG. 5. Authorities (502) may be implemented on the non-volatile solid state storage (418), for example as lists or other data structures stored in memory. In some embodiments the authorities may be stored within the non-volatile solid state storage (418) and supported by software executing on a controller or other processor of the non-volatile solid state storage (418). In a further embodiment, the authorities (502) may be implemented on the storage nodes (412), for example, as lists or other data structures stored in memory and supported by software executing on a CPU of the storage node (412). The authorities (502) may control how and where data is stored in the non-volatile solid state storage (418) in some embodiments. This control may assist in determining which type of erasure coding scheme is applied to the data, and which storage nodes (412) have which portions of the data. Each authority (502) may be assigned to a non-volatile solid state storage (418). Each authority may also control a range of inode numbers, segment numbers, or other data identifiers which are assigned to data by a file system, by the storage nodes (412), or by the non-volatile solid state storage (418), in various embodiments.

Every piece of data, and every piece of metadata, may have redundancy in the system in some embodiments. In addition, every piece of data and every piece of metadata may have an owner, which may be referred to as an authority (502). If that authority (502) is unreachable, for example through failure of a storage node (412), there may be a plan of succession for how to find that data or that metadata. In various embodiments, there are redundant copies of authorities (502). Authorities (502) may have a relationship to storage nodes (412) and to non-volatile solid state storage (418) in some embodiments. Each authority (502), covering a range of data segment numbers or other identifiers of the data, may be assigned to a specific non-volatile solid state storage (418). In some embodiments the authorities (502) for all of such ranges are distributed over the non-volatile solid state storage (418) of a storage cluster. Each storage node (412) may have a network port that provides access to the non-volatile solid state storage (418) of that storage node (412). Data can be stored in a segment, which is associated with a segment number and that segment number is an indirection for a configuration of a RAID stripe in some embodiments. The assignment and use of the authorities (502) may therefore establish an indirection to data. Indirection may be referred to as the ability to reference data indirectly, in this case via an authority (502), in accordance with some embodiments. A segment may identify a set of non-volatile solid state storage (418) and a local identifier into the set of non-volatile solid state storage (418) that may contain data. In some embodiments, the local identifier is an offset into the device and may be reused sequentially by multiple segments. In other embodiments the local identifier is unique for a specific segment and never reused. The offsets in the non-volatile solid state storage (418) may be applied to locating data for writing to or reading from the non-volatile solid state storage (418) (in the form of a RAID stripe). Data may be striped across multiple units of non-volatile solid state storage (418), which may include or be different from the non-volatile solid state storage (418) having the authority (502) for a particular data segment.

If there is a change in where a particular segment of data is located, e.g., during a data move or a data reconstruction, the authority (502) for that data segment may be consulted, at that non-volatile solid state storage (418) or storage node (412) having that authority (502). In order to locate a particular piece of data, embodiments calculate a hash value for a data segment or apply an inode number or a data segment number. The output of this operation points to a non-volatile solid state storage (418) having the authority (502) for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage (418), which may be done through an explicit mapping. The operation is repeatable, so that when the calculation is performed, the result of the calculation repeatably and reliably points to a particular non-volatile solid state storage (418) having that authority (502). The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage (418) for an authority in the presence of a set of non-volatile solid state storage (418) that are reachable and constitute the same cluster. The calculation also determines an ordered set of peer non-volatile solid state storage (418) that will also record the authority to non-volatile solid state storage mapping so that the authority may be determined even if the assigned non-volatile solid state storage is unreachable. A duplicate or substitute authority (502) may be consulted if a specific authority (502) is unavailable in some embodiments.

With reference to FIGS. 4 and 5, two of the many tasks of the CPU (416) on a storage node (412) are to break up write data and reassemble read data. When the system has determined that data is to be written, the authority (502) for that data is located as above. When the segment ID for data is already determined the request to write is forwarded to the non-volatile solid state storage (418) currently determined to be the host of the authority (502) determined from the segment. The host CPU (416) of the storage node (412), on which the non-volatile solid state storage (418) and corresponding authority (502) reside, may then breaks up or shard the data and transmits the data out to various non-volatile solid state storage (418). The transmitted data may be written as a data stripe in accordance with an erasure coding scheme. In some embodiments, data is requested to be pulled, and in other embodiments, data is pushed. In reverse, when data is read, the authority (502) for the segment ID containing the data is located as described above. The host CPU (416) of the storage node (412) on which the non-volatile solid state storage (418) and corresponding authority (502) reside may request the data from the non-volatile solid state storage and corresponding storage nodes pointed to by the authority. In some embodiments the data is read from flash storage as a data stripe. The host CPU (416) of storage node (412) may then reassemble the read data, correcting any errors (if present) according to the appropriate erasure coding scheme, and forward the reassembled data to the network. In further embodiments, some or all of these tasks can be handled in the non-volatile solid state storage (418). In some embodiments, the segment host requests the data be sent to storage node (412) by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution may be an entity, and an entity can be a file, a directory or a segment. That is, entities are units of data or metadata stored by a storage system. Entities may be grouped into sets called authorities. Each authority may have an authority owner, which is a storage node that has the exclusive right to update the entities in the authority. In other words, a storage node may contain the authority, and that the authority may, in turn, contain entities.

A segment may be a logical container of data in accordance with some embodiments. A segment may be an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment may be protected, e.g., from memory and other failures, by breaking the segment into a number of data and parity shards, where applicable. The data and parity shards may be distributed, i.e., striped, across non-volatile solid state storage (418) coupled to the host CPUs (416) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations may take place across an entire storage system. At the top may be the directory entries (file names) which link to an inode. Modes may point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses may then be translated into physical flash locations. Physical flash locations may have an address range bounded by the amount of flash in the system in accordance with some embodiments. Medium addresses and segment addresses may be logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage (418) unit may be assigned a range of address space. Within this assigned range, the non-volatile solid state storage (418) may be able to allocate addresses without synchronization with other non-volatile solid state storage (418).

Data and metadata may be stored by a set of underlying storage layouts that are optimized for varying workload patterns and storage devices. These layouts may incorporate multiple redundancy schemes, compression formats and index algorithms. Some of these layouts may store information about authorities and authority masters, while others may store file metadata and file data. The redundancy schemes may include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Reed-Solomon encoding may be used within a storage cluster, and mirroring may be used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes may agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing (RUSH) family of hashes, including Controlled Replication Under Scalable Hashing (CRUSH). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures may lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy may be independent of the placement of authorities for data consistency. In some embodiments, storage nodes that contain authorities may not contain any persistent storage. Instead, the storage nodes may be connected to non-volatile solid state storage units that do not contain authorities. The communications interconnect between storage nodes and non-volatile solid state storage units can consist of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters may be connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners may have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority may be transferred to a new storage node. Transient failures can make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system may go into a self-preservation mode and halt replication and data movement activities until an administrator intervenes in accordance with some embodiments.

Persistent messages may be persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address may virtualize addresses. These virtualized addresses may not change over the lifetime of the storage system, regardless of component failures and replacements. This allows each component of the storage system to be replaced over time without reconfiguration or disruptions of client request processing.

In some embodiments, the virtualized addresses are stored with sufficient redundancy. A continuous monitoring system may correlate hardware and software status and the hardware identifiers. This allows detection and prediction of failures due to faulty components and manufacturing details. The monitoring system may also enable the proactive transfer of authorities and entities away from impacted devices before failure occurs by removing the component from the critical path in some embodiments.

Figure 6:
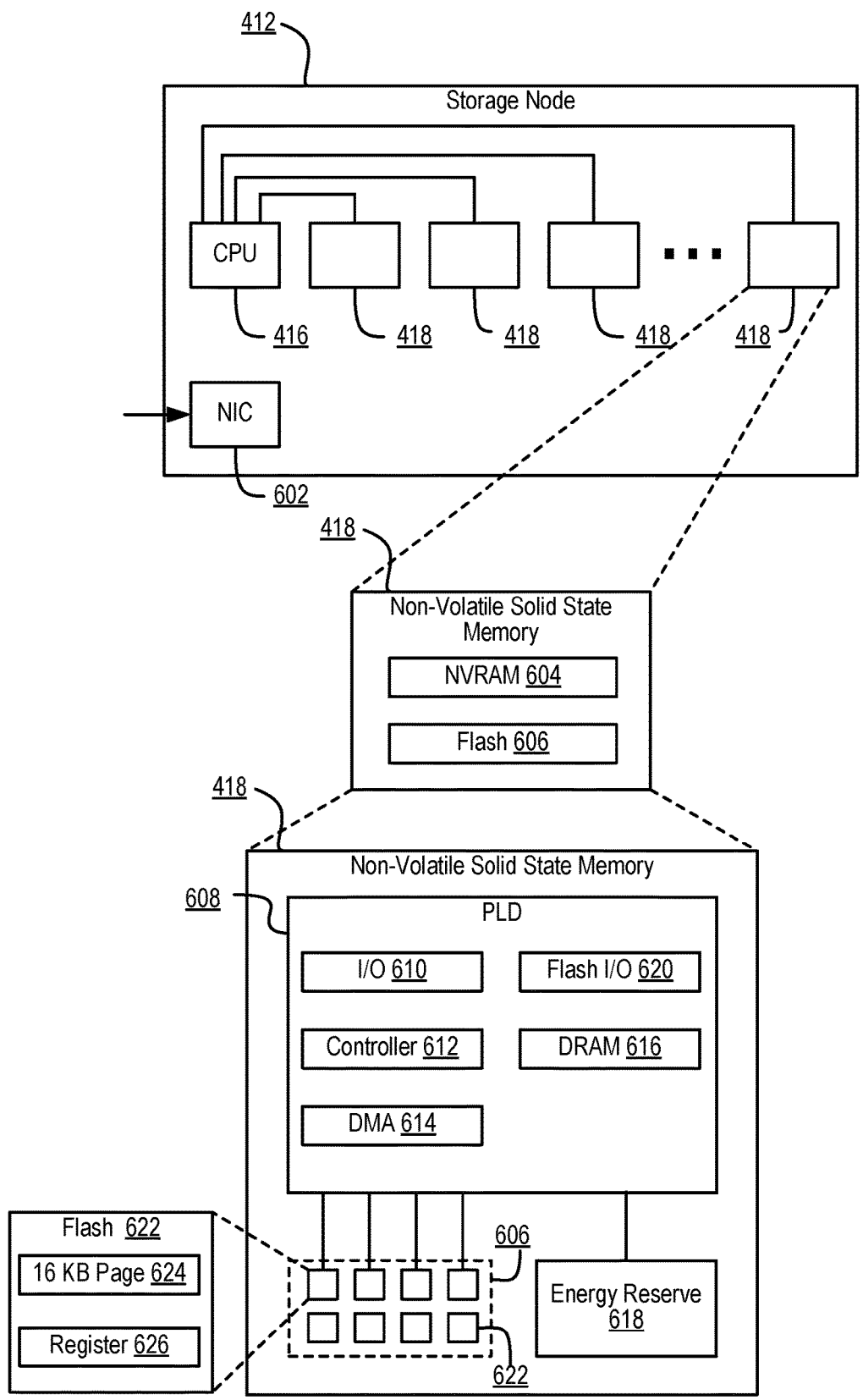
FIG. 6 is a multiple level block diagram, showing contents of a storage node and contents of a non-volatile solid state storage of the storage node according to some embodiments of the present disclosure.

FIG. 6 is a multiple level block diagram, showing contents of a storage node (412) and contents of a non-volatile solid state storage (418) of the storage node (412) according to some embodiments of the present disclosure. Data may be communicated to and from the storage node (412) by a network interface controller (NIC) (602) in some embodiments. Each storage node (412) may include a CPU (416), and one or more non-volatile solid state storage (418), as discussed above. Moving down one level in FIG. 6, each non-volatile solid state storage (418) may have a relatively fast non-volatile solid state memory, such as NVRAM (604), and flash memory (606). In some embodiments, NVRAM (604) may be a component that does not require program/erase cycles (DRAM, MRAM, PCM), and can be a memory that can support being written vastly more often than the memory is read from. Moving down another level in FIG. 6, the NVRAM (604) may be implemented in one embodiment as high speed volatile memory, such as DRAM (616), backed up by an energy reserve (618). The energy reserve (618) may provide sufficient electrical power to keep the DRAM (616) powered long enough for contents to be transferred to the flash memory (606) in the event of power failure. In some embodiments, the energy reserve (618) is a capacitor, super-capacitor, battery, or other device, that supplies a suitable supply of energy sufficient to enable the transfer of the contents of DRAM (616) to a stable storage medium in the case of power loss. The flash memory (616) may be implemented as multiple flash dies (622), which may be referred to as packages of flash dies (622) or an array of flash dies (622). It should be appreciated that the flash dies (622) could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage (418) has a controller (612) or other processor, and an I/O port (610) coupled to the controller (612). The I/O (610) port may be coupled to the CPU (416) and/or the network interface controller (602) of the flash storage node (412). A flash I/O (620) port may be coupled to the flash dies (622), and a DMA (614) unit may be coupled to the controller (612), the DRAM (616), and the flash dies (622). In the embodiment shown, the I/O (610) port, controller (612), DMA unit (614), and flash I/O (620) port may be implemented on a programmable logic device (PLD) (608), e.g., an FPGA. In this embodiment, each flash die (622) has pages, organized as sixteen kB (kilobyte) pages (624) and a register (626) through which data can be written to or read from the flash die (622). In further embodiments, other types of solid-state memory are used in place of, or in addition to flash memory illustrated within flash die (622).

Storage clusters, in various embodiments as disclosed herein, can be contrasted with storage arrays in general. The storage nodes (412) may be part of a collection that creates the storage cluster. Each storage node (412) may own a slice of data and computing required to provide the data. Multiple storage nodes (412) can cooperate to store and retrieve the data. Storage memory or storage devices, as used in storage arrays in general, may be less involved with processing and manipulating the data. Storage memory or storage devices in a storage array may receive commands to read, write, or erase data. The storage memory or storage devices in a storage array may not be aware of a larger system in which they are embedded, or what the data means. Storage memory or storage devices in storage arrays can include various types of storage memory, such as RAM, solid state drives, hard disk drives, etc. The non-volatile solid state storage (418) units described herein may have multiple interfaces active simultaneously and serving multiple purposes. In some embodiments, some of the functionality of a storage node (412) is shifted into a non-volatile solid state storage (418) unit, transforming the non-volatile solid state storage (418) unit into a combination of non-volatile solid state storage (418) unit and storage node (412). Placing computing (relative to storage data) into the non-volatile solid state storage (418) unit places this computing closer to the data itself. The various system embodiments have a hierarchy of storage node layers with different capabilities. By contrast, in a storage array, a controller may own and know everything about all of the data that the controller manages in a shelf or storage devices. In a storage cluster, as described herein, multiple controllers in multiple non-volatile solid state storage (418) units and/or storage nodes (412) may cooperate in various ways (e.g., for erasure coding, data sharding, metadata communication and redundancy, storage capacity expansion or contraction, data recovery, and so on).

Figure 7:
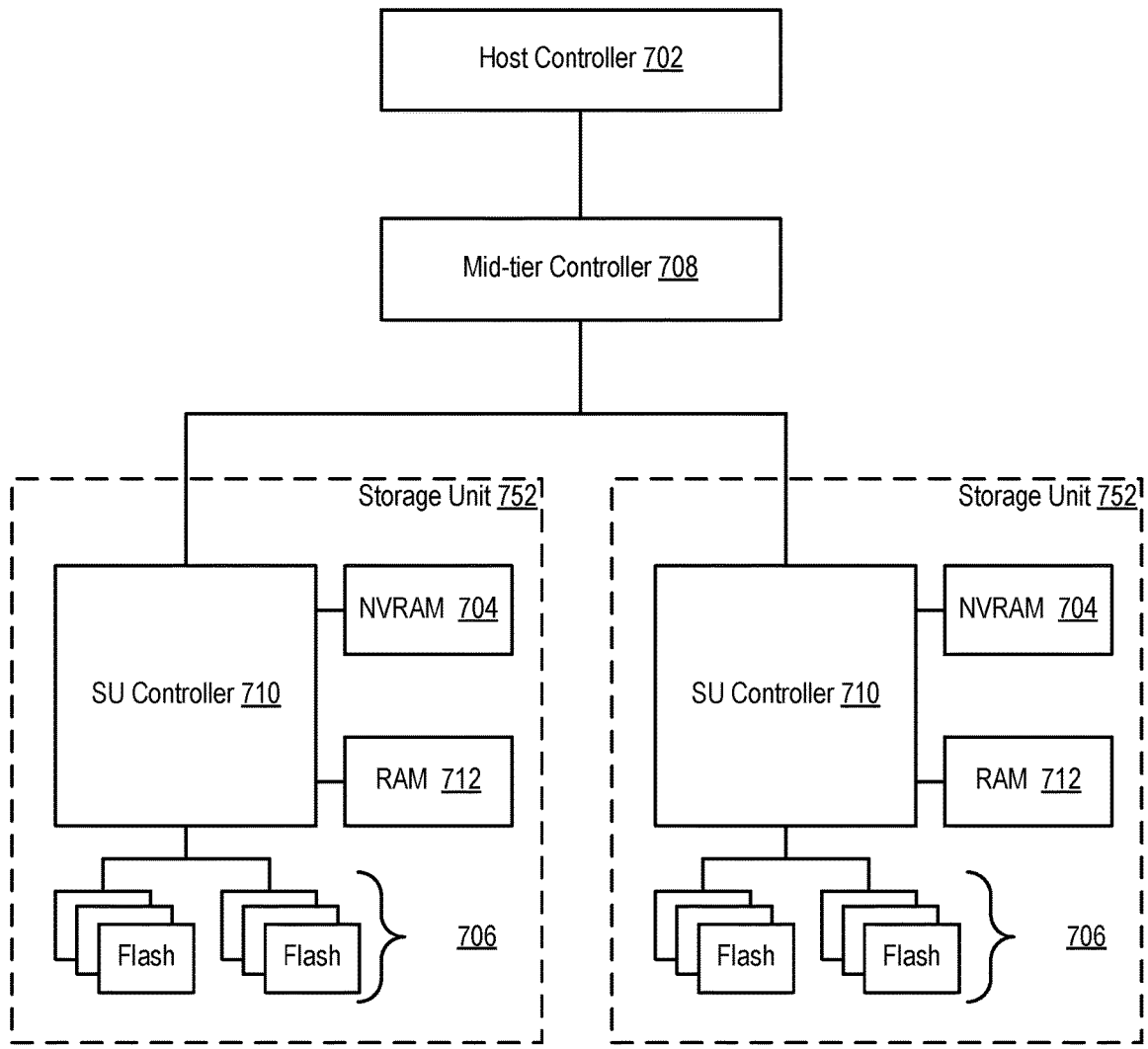
FIG. 7 illustrates a storage server environment which may utilize embodiments of the storage nodes and storage units according to some embodiments of the present disclosure.

FIG. 7 illustrates a storage server environment, which may utilize embodiments of the storage nodes and storage units according to some embodiments of the present disclosure. Each storage unit (752) depicted in FIG. 7 can include a processor (e.g., such as controller (612 in FIG. 7), an FPGA, RAM (712), flash memory (706), and NVRAM (704) on a PCIe board in a chassis. The storage unit (752) may be implemented as a single board containing storage, and may be the largest tolerable failure domain inside the chassis. In some embodiments, up to two storage units (752) may fail and the device will continue with no data loss.

The physical storage may be divided into named regions based on application usage in some embodiments. The NVRAM (704) may be a contiguous block of reserved memory in the storage unit (752) DRAM that is backed by NAND flash. The NVRAM (704) may be logically divided into multiple memory regions written for two as spool (e.g., spool_region). Space within the NVRAM (752) spools may be managed by each authority independently. Each device can provide an amount of storage space to each authority. That authority can further manage lifetimes and allocations within that space. Examples of a spool include distributed transactions or notions. When the primary power to a storage unit (752) fails, onboard super-capacitors can provide a short duration of power hold up. During this holdup interval, the contents of the NVRAM (704) may be flushed to flash memory (706). On the next power-on, the contents of the NVRAM (704) may be recovered from the flash memory (706).

As for the storage unit controller, the responsibility of the logical "controller" may be distributed across each of the blades containing authorities. This distribution of logical control is shown in FIG. 7 as a host controller (702), a mid-tier controller (708), and one or more storage unit controller (710). Management of the control plane and the storage plane are treated independently, although parts may be physically co-located on the same blade. Each authority can effectively serve as an independent controller. Each authority can provide its own data and metadata structures, its own background workers, and maintains its own lifecycle.

Figure 8:
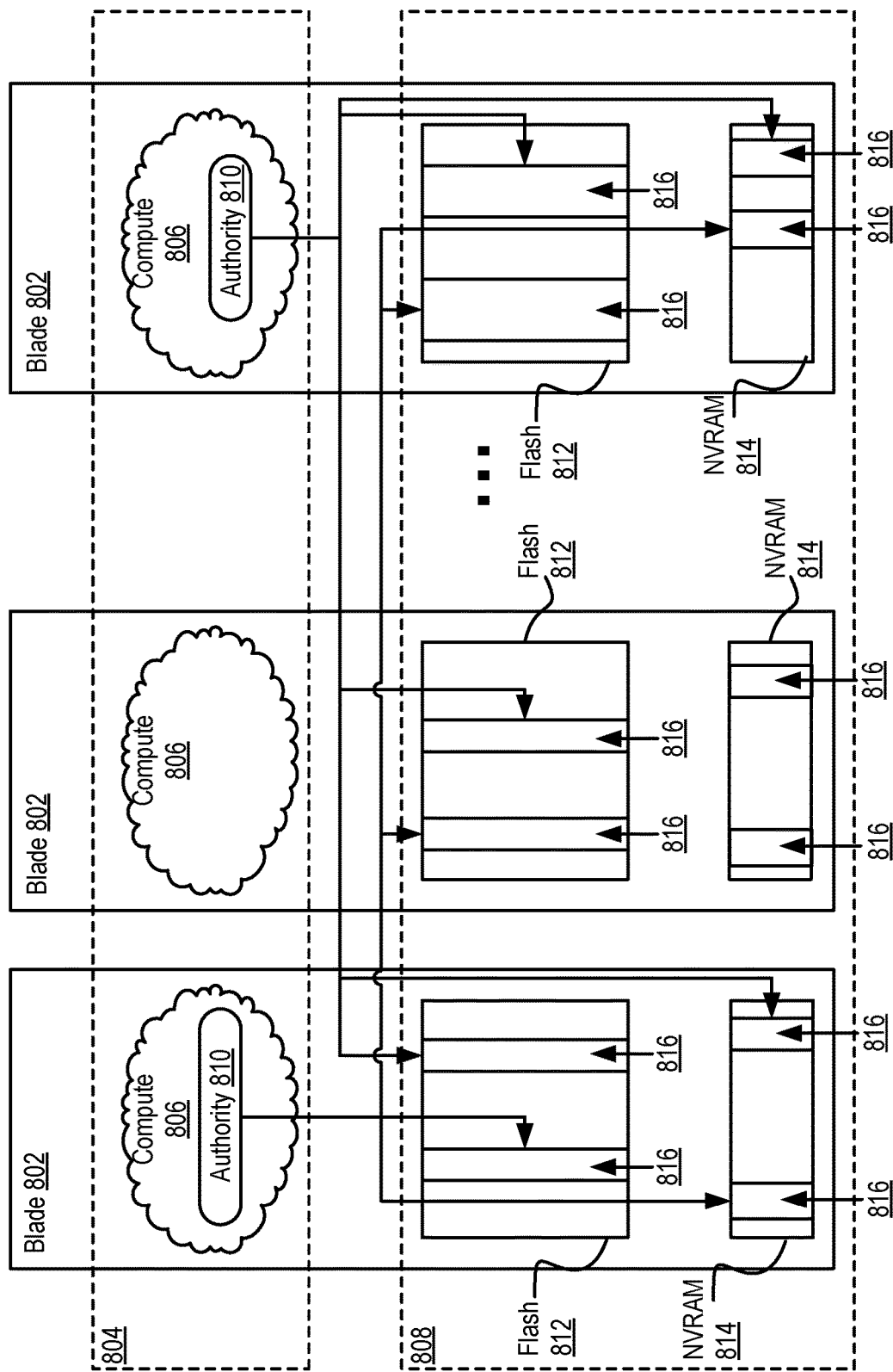
FIG. 8 illustrates a blade hardware block diagram according to some embodiments of the present disclosure.

FIG. 8 illustrates a blade (802) hardware block diagram according to some embodiments of the present disclosure. The example depicted in FIG. 8 includes a control plane (804), a compute plane (806), a storage plane (808), and authorities (810) interacting with underlying physical resources, using embodiments of the storage nodes, non-volatile solid state storage, storage units, or any combination thereof. The control plane (804) may be partitioned into a number of authorities (810) which can use the compute resources in the compute plane (806) to run on any of the blades (802). The storage plane (808) may be partitioned into a set of devices, each of which provides access to flash (812) and NVRAM (814) resources.

In the compute plane (806) and storage planes (808) of FIG. 8, the authorities (810) may interact with the underlying physical resources (i.e., devices). From the point of view of an authority (810), its resources may be striped over multiple the physical devices. From the point of view of a device, it provides resources to multiple authorities (810), irrespective of where the authorities happen to run. In order to communicate and represent the ownership of an authority (810), including the right to record persistent changes on behalf of that authority (810), the authority (810) may provide some evidence of authority ownership that can be independently verifiable. A token, for example, may be employed for this purpose and function in one embodiment.

Each authority (810) may have allocated or have been allocated one or more partitions (816) of storage memory in the storage units, e.g. partitions (816) in flash memory (812) and NVRAM (814). Each authority (810) may use those allocated partitions (816) that belong to it, for writing or reading user data. Authorities can be associated with differing amounts of physical storage of the system. For example, one authority (810) could have a larger number of partitions (816) or larger sized partitions (816) in one or more storage units than one or more other authority (810).

Readers will appreciate that the storage systems and the components that are contained in such storage systems, as described in the present disclosure, are included for explanatory purposes and do not represent limitations as to the types of systems that may be configured for on-demand content filtering of snapshots. In fact, storage systems configured for dynamically adjusting an amount of log data generated may be embodied in many other ways and may include fewer, additional, or different components. For example, storage within storage systems configured for dynamically adjusting an amount of log data generated may be embodied as block storage where data is stored in blocks, and each block essentially acts as an individual hard drive. Alternatively, storage within storage systems configured for dynamically adjusting an amount of log data generated may be embodied as object storage, where data is managed as objects. Each object may include the data itself, a variable amount of metadata, and a globally unique identifier, where object storage can be implemented at multiple levels (e.g., device level, system level, interface level). In addition, storage within storage systems configured for dynamically adjusting an amount of log data generated may be embodied as file storage in which data is stored in a hierarchical structure. Such data may be saved in files and folders, and presented to both the system storing it and the system retrieving it in the same format. Such data may be accessed using the Network File System ('NFS') protocol for Unix or Linux, Server Message Block ('SMB') protocol for Microsoft Windows, or in some other manner.

Figure 9:
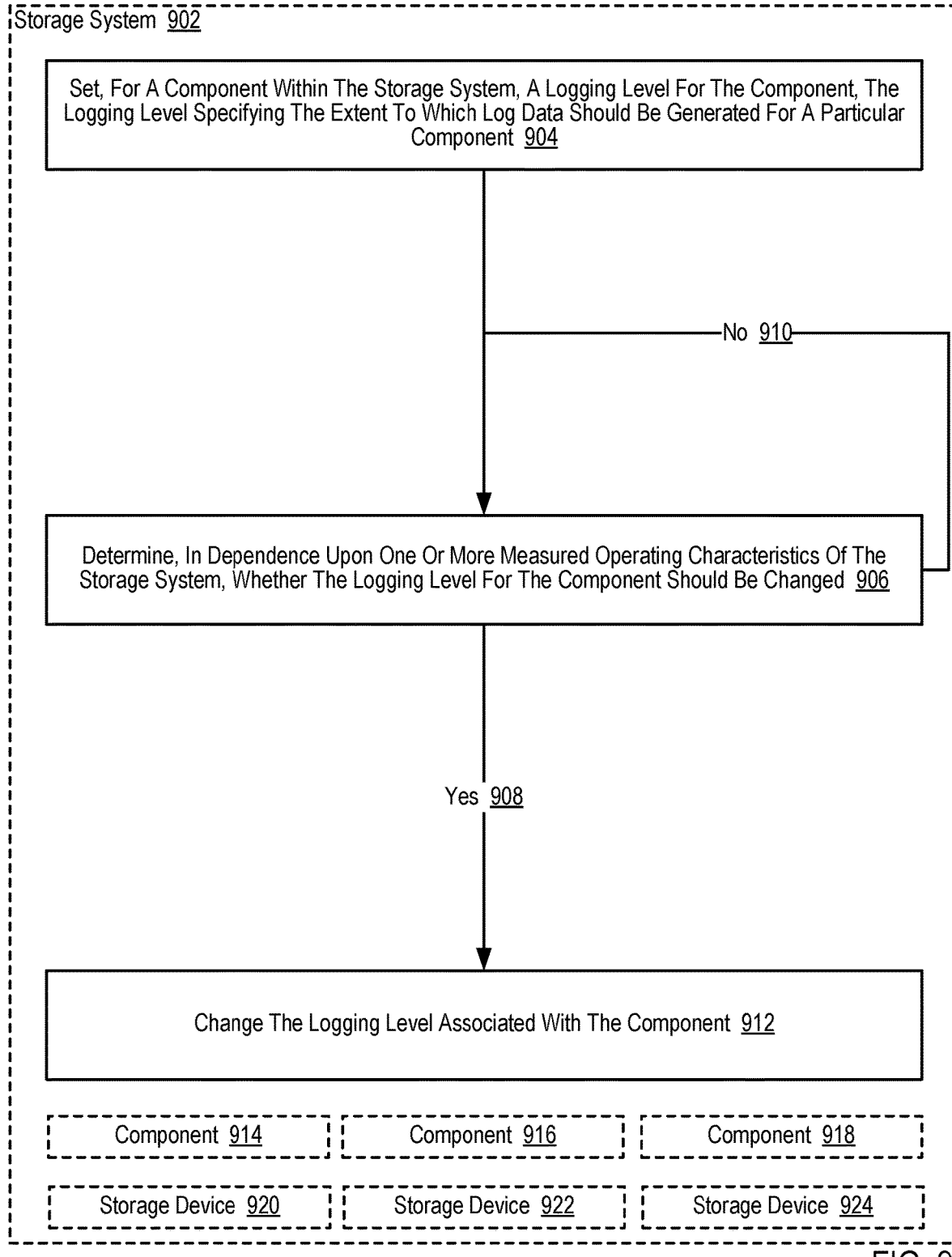
FIG. 9 sets forth a flow chart illustrating an example method of dynamically adjusting an amount of log data generated for a storage system that includes a plurality of storage devices according to some embodiments of the present disclosure.

For further explanation, FIG. 9 sets forth a flow chart illustrating an example method of dynamically adjusting an amount of log data generated for a storage system (902) that includes a plurality of storage devices (920, 922, 924) according to some embodiments of the present disclosure. Although depicted in less detail, the storage system (902) depicted in FIG. 9 may be similar to the storage systems described above with reference to FIGS. 1-8. The storage system depicted in FIG. 9 can include a plurality of components (914, 916, 918). Each component (914, 916, 918) may be embodied, for example, as one or more software modules, as one or more hardware modules, as a combination of one or more software modules and one or more hardware modules, or as some other logical or physical entity in the storage system (902).

Readers will appreciate that log data may be generated for the storage system (902). Such log data may include information describing actions taken by one or more components (914, 916, 918) in the storage system (902), the state of one or more components (914, 916, 918) in the storage system (902) at various points in time, errors encountered by one or more components (914, 916, 918) in the storage system (902), or other information. Such log data may be analyzed, for example, by a cloud-based management module or by some other management module to evaluate the operation of the storage system (902), to detect the potential occurrence of some problem within the storage system (902), to recommend configuration settings or changes to the storage system (902), or for a variety of different reasons. Readers will appreciate, however, that in order for a cloud-based management module to evaluate such log data, significant network resources may be consumed to send log data to the cloud-based management module and significant processing resources may be consumed to support the cloud-based management module's analysis of log data, even if the storage system (902) is healthy and operating as expected.

The example method depicted in FIG. 9 can include setting (904), for a component (914, 916, 918) within the storage array, a logging level for a component (914, 916, 918). The logging level for a particular component (914, 916, 918) can specify the extent to which log data should be generated for particular component (914, 916, 918). The logging level for a particular component (914, 916, 918) may be embodied, for example, as a numerical value selected from a range of possible values that form a priority scale. For example, a value of '10' may indicate that generating log data for a particular component is a highest priority, a value of '1' indicates that that generating log data for a particular component is a lowest priority, and the intervening values represent priority levels that increase as the numerical values increase. In such an example, and in order to limit the amount of network resources that will be consumed to send log data to a cloud-based management module and to limit the amount of processing resources consumed to support the cloud-based management module's analysis of log data, log data may only be generated for components with a logging level above a particular threshold (e.g., log data may only be generated for components with a logging level of 7 or above). Setting (904) a logging level for a component (914, 916, 918) may be carried out, for example, by applying a predetermined configuration when the storage system (902) boots, by applying a predetermined configuration when the particular component (914, 916, 918) boots or is otherwise added to the storage system (902), by issuing a request or command to the storage system (902) to set the logging level for one or more components (914, 916, 918), or in other ways.

The example method depicted in FIG. 9 can also include determining (906), in dependence upon one or more measured operating characteristics of the storage system (902), whether the logging level for a component (914, 916, 918) should be changed. In the example method depicted in FIG. 9, the one or more measured operating characteristics of the storage system (902) can include quantifiable metrics that describe the operation of the storage system (902). The one or more measured operating characteristics of the storage system (902) can include, for example, information describing the number of errors experienced by a particular component (914, 916, 918), information describing whether a particular component (914, 916, 918) has experienced an error within a predetermined period of time, or other information describing the extent to which one or more components (914, 916, 918) are encountering errors. In addition to error-related information, the one or more measured operating characteristics of the storage system (902) may include performance-related information for one or more components (914, 916, 918). Such performance-related information for one or more components (914, 916, 918) may include, for example, the number of requests serviced during a predetermined period of time, the amount of data transferred during a predetermined period of time, the average response time taken to service a request, an average amount of memory consumed during a predetermined period of time, or many other types of performance-related information. In addition to error-related information and performance-related information, the one or more measured operating characteristics of the storage system (902) may include state-related information for one or more components (914, 916, 918). Such state-related information for one or more components (914, 916, 918) may include, for example, information describing whether the component is powered on, information describing whether the component is actively executing, information describing one or more protocols used by a particular component, information describing a firmware version executing on a particular component, information describing the release version of a particular component, or many other types of state-related information.

In the example method depicted in FIG. 9, determining (906) whether the logging level for a component (914, 916, 918) should be changed in dependence upon one or more measured operating characteristics of the storage system (902) may be carried out, for example, by examining the one or more measured operating characteristics of the storage system (902) to determine whether a particular component (914, 916, 918) has experienced a predetermined number of errors within a predetermined period of time. Readers will appreciate that if a particular component (914, 916, 918) has experienced a predetermined number of errors within a predetermined period of time, the logging level for the particular component (914, 916, 918) may be increased or otherwise changed such that log data is more likely to be generated for the particular component (914, 916, 918). Readers will further appreciate that some components may be more error-tolerant than other components and that, as such, the error threshold for one component may be higher than the error threshold for another component. For example, a first component may be permitted to experience 100 errors/minute without resulting in an increase to its error logging level while a second component may have its error logging level changed to the highest available level in response to experiencing a single error.

Determining (906) whether the logging level for a component (914, 916, 918) should be changed in dependence upon one or more measured operating characteristics may also be carried out, for example, by comparing the one or more measured operating characteristics of the storage system (902) to one or more fingerprints of known system behavior. Such fingerprints may include information that describes the error-related characteristics, performance-related characteristics, state-related characteristics, or any combination of such characteristics that are exhibited by storage systems that are exhibiting a particular behavior. For example, a first fingerprint may include information indicating that when a particular software component on the storage system has a particular version number, a network adapter on the storage system is receiving more than a predetermined number of requests per unit of time, and the storage devices have less than a predetermined amount of available capacity, the storage system tends to exhibit the behavior of having an average I/O latency that is above an acceptable threshold. In such an example, if it is determined that the one or more measured operating characteristics are in alignment with the first fingerprint, the storage system (902) may determine that the logging level for one or more components (914, 916, 918) should be changed by increasing or otherwise changing the logging level for a particular component (914, 916, 918) such that log data is more likely to be generated for the particular component (914, 916, 918), as being in alignment with the first fingerprint tends to correlate with storage systems performing at undesirable levels. When the storage system is performing at undesirable levels, additional logging data may be useful as a diagnostic input.

As an additional example, a second fingerprint may include information indicating that when firmware on the storage devices in the storage system has a particular version number, a network adapter is sending and receiving data using a particular protocol, and a particular software component (e.g., a garbage collection process), the storage system tends to exhibit the behavior of having an average I/O latency that is below an acceptable threshold. In such an example, if it is determined that the one or more measured operating characteristics are in alignment with the second fingerprint, the storage system (902) may determine that the logging level for one or more components (914, 916, 918) should be changed by decreasing or otherwise changing the logging level for a particular component (914, 916, 918) such that log data is less likely to be generated for the particular component (914, 916, 918), as being in alignment with the second fingerprint tends to correlate with storage systems performing at acceptable levels. When the storage system is performing at acceptable levels, it may be undesirable to dedicate significant resources to performing diagnostic operations on a storage system that appears to be relatively healthy.

Readers will appreciate that such fingerprints may be developed, for example, by processing log data and other forms of telemetry data from many storage systems to identify patterns exhibited by storage systems that are exhibiting (or are predicted to exhibit) some known behavior. In the example method depicted in FIG. 9, comparing the one or more measured operating characteristics of the storage system (902) to one or more fingerprints may be carried out in real-time or, as one alternative, by a module on a cloud-based services provider comparing log data or other forms of telemetry data from the storage system (902) to a catalog of fingerprints.

Although the preceding paragraphs describes embodiments where determining (906) whether the logging level for a component (914, 916, 918) should be changed in dependence upon one or more measured operating characteristics of the storage system (902) results in increasing or otherwise changing the logging level for a particular component (914, 916, 918) such that log data is more likely to be generated for the particular component (914, 916, 918), the storage system (902) may also determine (906) that the logging level for a component (914, 916, 918) should be decreased or otherwise changed such that log data is less likely to be generated for the particular component (914, 916, 918). Decreasing the logging level or otherwise changing the logging level such that log data is less likely to be generated for the particular component (914, 916, 918) may occur over time, for example, by decreasing the logging level by one unit after the expiration of a predetermined period of time without experiencing an error. Alternatively, decreasing the logging level or otherwise changing the logging level such that log data is less likely to be generated for the particular component (914, 916, 918) may occur over time or instantaneously, for example, by decreasing the logging level in response to the occurrence of some event such as the component falling out of alignment with a fingerprint. Increasing the logging level or otherwise changing the logging level such that log data is more likely to be generated for the particular component (914, 916, 918) may also occur over time or instantaneously.

The example method depicted in FIG. 9 can also include, responsive to affirmatively (908) determining that the logging level for the component (914, 916, 918) should be changed, changing (912) the logging level associated with the component (914, 916, 918). Changing (912) the logging level associated with the component (914, 916, 918) may be carried out, for example, by decreasing the logging level by a predetermined amount, by increasing the logging level a predetermined amount, by increasing the logging level to the highest available value, by decreasing the logging level to the lowest available value, and in other ways. In such an example, changing (912) the logging level associated with the component may be carried out by issuing a request or command to the storage system (902) to set the logging level for one or more components (914, 916, 918), in response to the storage system (902) receiving a request or command to change the logging level for one or more components (914, 916, 918), or in other ways. Readers will appreciate that if the storage system (902) determines that the logging level for the component (914, 916, 918) should not (910) be changed, the storage system (902) may continue be monitored.

Figure 10:
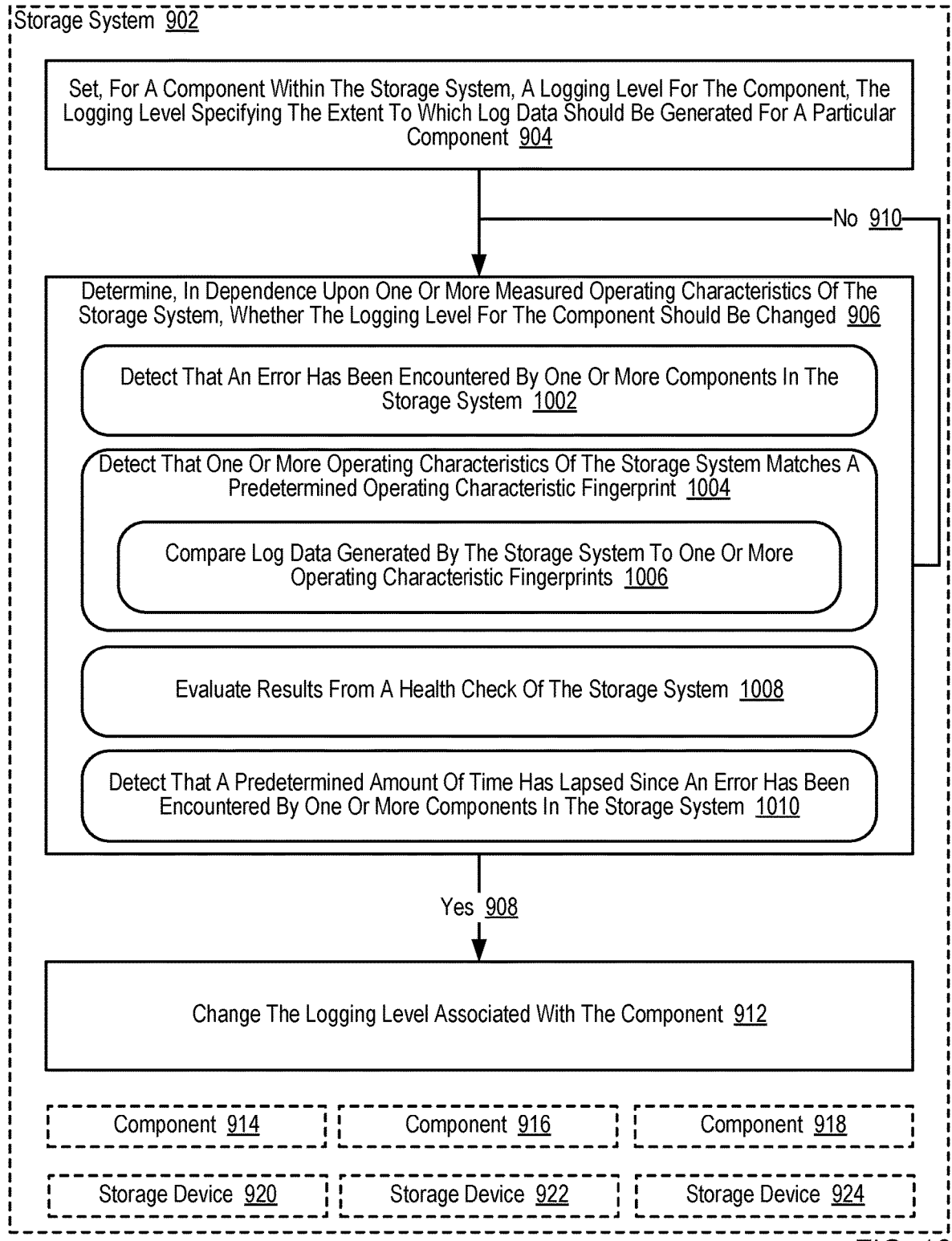
FIG. 10 sets forth a flow chart illustrating an additional example method of dynamically adjusting an amount of log data generated for a storage system that includes a plurality of storage devices according to some embodiments of the present disclosure.

For further explanation, FIG. 10 sets forth a flow chart illustrating an additional example method of dynamically adjusting an amount of log data generated for a storage system (902) that includes a plurality of storage devices (920, 922, 924) according to some embodiments of the present disclosure. The example method depicted in FIG. 10 is similar to the example method depicted in FIG. 9, as the example method depicted in FIG. 10 also includes setting (904), for a component (914, 916, 918) within the storage array, a logging level for a component (914, 916, 918), determining (906), in dependence upon one or more measured operating characteristics of the storage system (902), whether the logging level for a component (914, 916, 918) should be changed, and responsive to affirmatively (908) determining that the logging level for the component (914, 916, 918) should be changed, changing (912) the logging level associated with the component (914, 916, 918).

In the example method depicted in FIG. 10, determining (906) whether the logging level for a component (914, 916, 918) should be changed can include detecting (1002) that an error has been encountered by one or more components (914, 916, 918) in the storage system (902). Detecting (1002) that an error has been encountered by one or more components (914, 916, 918) in the storage system (902) may be carried out, for example, by examining an error log, by examining log data that includes an identification of errors encountered by components within the storage system, by receiving a message or other form of notification from a component that has experienced an error, or in some other way. Readers will appreciate that because an error has been encountered by one or more components (914, 916, 918) in the storage system (902), it may be desirable to have the storage system (902) generate more robust logs such that one or more components (914, 916, 918) in the storage system (902) may be closely monitored.

In the example method depicted in FIG. 10, determining (906) whether the logging level for a component (914, 916, 918) should be changed can also include detecting (1004) that one or more operating characteristics of the storage system (902) matches a predetermined operating characteristic fingerprint. A predetermined operating characteristic fingerprint may include information that describes the error-related characteristics, performance-related characteristics, state-related characteristics, or any combination of such characteristics that are exhibited by storage systems that are exhibiting a particular behavior. For example, a first predetermined operating characteristic fingerprint may include information indicating that when a particular software component on the storage system has a particular version number, a network adapter on the storage system is receiving more than a predetermined number of requests per unit of time, and the storage devices have less than a predetermined amount of available capacity, the storage system tends to exhibit the behavior of having an average I/O latency that is above an acceptable threshold. In such an example, if it is determined that operating characteristics of the storage system (902) matches such a predetermined operating characteristic fingerprint, the storage system (902) may determine that the logging level for one or more components (914, 916, 918) should be changed by increasing or otherwise changing the logging level for a particular component (914, 916, 918) such that log data is more likely to be generated for the particular component (914, 916, 918), as being in alignment with the first predetermined operating characteristic fingerprint tends to correlate with storage systems performing at undesirable levels. When the storage system is performing at undesirable levels, additional logging data may be useful as a diagnostic input.

As an additional example, a second predetermined operating characteristic fingerprint may include information indicating that when firmware on the storage devices in the storage system has a particular version number, a network adapter is sending and receiving data using a particular protocol, and a particular software component (e.g., a garbage collection process), the storage system tends to exhibit the behavior of having an average I/O latency that is below an acceptable threshold. In such an example, if it is determined that operating characteristics of the storage system (902) matches such a predetermined operating characteristic fingerprint, the storage system (902) may determine that the logging level for one or more components (914, 916, 918) should be changed by decreasing or otherwise changing the logging level for a particular component (914, 916, 918) such that log data is less likely to be generated for the particular component (914, 916, 918), as being in alignment with the second predetermined operating characteristic fingerprint tends to correlate with storage systems performing at acceptable levels. When the storage system is performing at acceptable levels, it may be undesirable to dedicate significant resources to performing diagnostic operations on a storage system that appears to be relatively healthy. Readers will appreciate that such predetermined operating characteristic fingerprint may be developed, for example, by processing log data and other forms of telemetry data from many storage systems to identify patterns exhibited by storage systems that are exhibiting (or are predicted to exhibit) some known behavior.

In the example method depicted in FIG. 10, detecting (1004) that one or more operating characteristics of the storage system (902) matches a predetermined operating characteristic fingerprint can include comparing (1006) log data generated by the storage system (902) to one or more operating characteristic fingerprints. Comparing (1006) log data generated by the storage system (902) to one or more operating characteristic fingerprints may be carried out, for example, by an entity such as a controller as the log data is being generated or, in an alternative embodiment, by an entity such as a cloud-based management module, a remote array-services provider, or other entity. As such, comparing (1006) log data generated by the storage system (902) to one or more operating characteristic fingerprints may be part of a larger effort to analyze the content of log data for the purpose of monitoring and evaluating the operation of the storage system (902).

In the example method depicted in FIG. 10, determining (906) whether the logging level for a component (914, 916, 918) should be changed can also include evaluating (1008) results from a health check of the storage system (902). A health check of the storage system (902) may be performed by one or more modules that are executing on the storage array controller or on some other device. Such modules may include computer program instructions that, when executed, perform a scan of the storage system (902) to determine whether various components of the storage system (902), and the storage system (902) generally, are operating within specified parameters. Such a health check may be performed periodically and may provide ongoing analysis of the health of the storage system (902) and the components contained therein. In such an example, if the results from a health check of the storage system (902) indicate that one or more components are not operating as expected, the logging level for one or more components (914, 916, 918) may be changed by increasing or otherwise changing the logging level for a particular component (914, 916, 918) such that log data is more likely to be generated for the particular component (914, 916, 918). Alternatively, if the results from a health check of the storage system (902) indicate that one or more components are operating as expected, the logging level for such components (914, 916, 918) may be changed by decreasing or otherwise changing the logging level for a particular component (914, 916, 918) such that log data is less likely to be generated for the components (914, 916, 918). Evaluating (1008) results from a health check of the storage system (902) may be carried out, for example, by an entity such as a controller as the results from the health check are being generated or, in an alternative embodiment, by an entity such as a cloud-based management module, a remote array-services provider, or other entity. As such, evaluating (1008) results from a health check may be part of a larger effort to monitor and evaluate the operation of the storage system (902).

In the example method depicted in FIG. 10, determining (906) whether the logging level for a component (914, 916, 918) should be changed can also include detecting (1010) that a predetermined amount of time has lapsed since an error has been encountered by one or more components (914, 916, 918) in the storage system (902). Detecting (1010) that a predetermined amount of time has lapsed since an error has been encountered by one or more components (914, 916, 918) in the storage system (902) may be carried out, for example, through the use of one or more timers that reset when an error is encountered by one or more particular components (914, 916, 918), by periodically comparing a time stamp that is associated with the last error that was encountered by one or more particular components (914, 916, 918) to a current clock time, and in other ways. In some embodiments, when it is detected (1010) that a predetermined amount of time has lapsed since an error has been encountered by one or more particular components (914, 916, 918), the logging level associated with the one or more particular components (914, 916, 918) may be decreased or otherwise changed such that log data is less likely to be generated for the one or more particular components (914, 916, 918). In such a way, a decay schedule may be set up such that as components return to health and cease encountering errors, the amount of log data that is generated for the one or more particular components (914, 916, 918) decreases.

Figure 11:
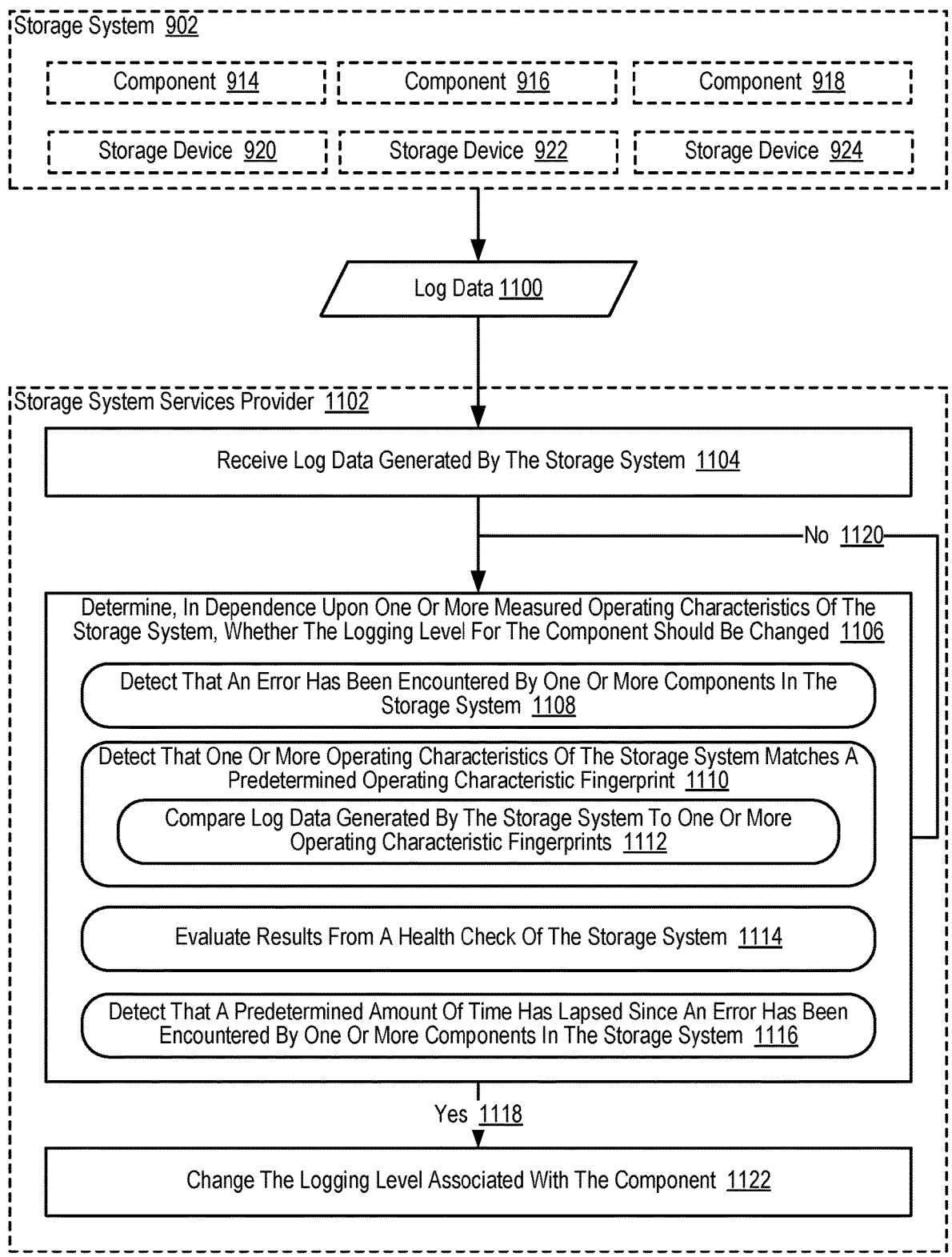
FIG. 11 sets forth a flow chart illustrating an additional example method of dynamically adjusting an amount of log data generated for a storage system that includes a plurality of storage devices according to some embodiments of the present disclosure.

For further explanation, FIG. 11 sets forth a flow chart illustrating an additional example method of dynamically adjusting an amount of log data generated for a storage system (902) that includes a plurality of storage devices (920, 922, 924) according to some embodiments of the present disclosure. The example method depicted in FIG. 11 is carried out, at least in part, by a storage system services provider (1102). The storage system services provider (1102) may be embodied, for example, as one or more servers or other computing devices that are not part of the storage system (902), as a collection of cloud resources that are not part of the storage system (902), or as some other remote system that provides services to a storage system (902).

The example method depicted in FIG. 11 includes receiving (1104) log data (1100) generated by the storage system (902). In the example method depicted in FIG. 11, the storage system services provider (1102) may receive (1104) log data (1100) generated by the storage system (902), for example, via one or more message received from the storage system (902), by polling the storage system (902) for log data (1100), or in other ways. In such an example, the storage system services provider (1102) and the storage system (902) may be coupled for data communications via one or more data communications networks, via a dedicated data communications link, or in some other way. In some embodiments, the log data (1100) may be encrypted using data encryption keys, communication links may be secure, or other security measures may be taken to protect the log data (1100).

The example method depicted in FIG. 11 also includes determining (1106), in dependence upon one or more measured operating characteristics of the storage system (902), whether the logging level for a component (914, 916, 918) should be changed. In the example method depicted in FIG. 11, the one or more measured operating characteristics of the storage system (902) can include quantifiable metrics that describe the operation of the storage system (902). The one or more measured operating characteristics of the storage system (902) can include, for example, information describing the number of errors experienced by a particular component (914, 916, 918), information describing whether a particular component (914, 916, 918) has experienced an error within a predetermined period of time, or other information describing the extent to which one or more components (914, 916, 918) are encountering errors. In addition to error-related information, the one or more measured operating characteristics of the storage system (902) may include performance-related information for one or more components (914, 916, 918). Such performance-related information for one or more components (914, 916, 918) may include, for example, the number of requests serviced during a predetermined period of time, the amount of data transferred during a predetermined period of time, the average response time taken to service a request, an average amount of memory consumed during a predetermined period of time, or many other types of performance-related information. In addition to error-related information and performance-related information, the one or more measured operating characteristics of the storage system (902) may include state-related information for one or more components (914, 916, 918). Such state-related information for one or more components (914, 916, 918) may include, for example, information describing whether the component is powered on, information describing whether the component is actively executing, information describing one or more protocols used by a particular component, information describing a firmware version executing on a particular component, information describing the release version of a particular component, or many other types of state-related information.

In the example method depicted in FIG. 11, determining (1106) whether the logging level for a component (914, 916, 918) should be changed in dependence upon one or more measured operating characteristics of the storage system (902) may be carried out, for example, by examining the one or more measured operating characteristics of the storage system (902) to determine whether a particular component (914, 916, 918) has experienced a predetermined number of errors within a predetermined period of time. Readers will appreciate that if a particular component (914, 916, 918) has experienced a predetermined number of errors within a predetermined period of time, the logging level for the particular component (914, 916, 918) may be increased or otherwise changed such that log data is more likely to be generated for the particular component (914, 916, 918). Readers will further appreciate that some components may be more error-tolerant than other components and that, as such, the error threshold for one component may be higher than the error threshold for another component. For example, a first component may be permitted to experience 100 errors/minute without resulting in an increase to its error logging level while a second component may have its error logging level changed to the highest available level in response to experiencing a single error.

Determining (1106) whether the logging level for a component (914, 916, 918) should be changed in dependence upon one or more measured operating characteristics may also be carried out, for example, by comparing the one or more measured operating characteristics of the storage system (902) to one or more fingerprints of known system behavior. Such fingerprints may include information that describes the error-related characteristics, performance-related characteristics, state-related characteristics, or any combination of such characteristics that are exhibited by storage systems that are exhibiting a particular behavior. For example, a first fingerprint may include information indicating that when a particular software component on the storage system has a particular version number, a network adapter on the storage system is receiving more than a predetermined number of requests per unit of time, and the storage devices have less than a predetermined amount of available capacity, the storage system tends to exhibit the behavior of having an average I/O latency that is above an acceptable threshold. In such an example, if it is determined that the one or more measured operating characteristics are in alignment with the first fingerprint, the storage system (902) may determine that the logging level for one or more components (914, 916, 918) should be changed by increasing or otherwise changing the logging level for a particular component (914, 916, 918) such that log data is more likely to be generated for the particular component (914, 916, 918), as being in alignment with the first fingerprint tends to correlate with storage systems performing at undesirable levels. When the storage system is performing at undesirable levels, additional logging data may be useful as a diagnostic input.

As an additional example, a second fingerprint may include information indicating that when firmware on the storage devices in the storage system has a particular version number, a network adapter is sending and receiving data using a particular protocol, and a particular software component (e.g., a garbage collection process), the storage system tends to exhibit the behavior of having an average I/O latency that is below an acceptable threshold. In such an example, if it is determined that the one or more measured operating characteristics are in alignment with the second fingerprint, the storage system (902) may determine that the logging level for one or more components (914, 916, 918) should be changed by decreasing or otherwise changing the logging level for a particular component (914, 916, 918) such that log data is less likely to be generated for the particular component (914, 916, 918), as being in alignment with the second fingerprint tends to correlate with storage systems performing at acceptable levels. When the storage system is performing at acceptable levels, it may be undesirable to dedicate significant resources to performing diagnostic operations on a storage system that appears to be relatively healthy.

Readers will appreciate that such fingerprints may be developed, for example, by processing log data and other forms of telemetry data from many storage systems to identify patterns exhibited by storage systems that are exhibiting (or are predicted to exhibit) some known behavior. In the example method depicted in FIG. 11, comparing the one or more measured operating characteristics of the storage system (902) to one or more fingerprints may be carried out in real-time or, as one alternative, by a module on a cloud-based services provider comparing log data or other forms of telemetry data from the storage system (902) to a catalog of fingerprints.

Although the preceding paragraphs describes embodiments where determining (1106) whether the logging level for a component (914, 916, 918) should be changed in dependence upon one or more measured operating characteristics of the storage system (902) results in increasing or otherwise changing the logging level for a particular component (914, 916, 918) such that log data is more likely to be generated for the particular component (914, 916, 918), the storage system (902) may also determine (1106) that the logging level for a component (914, 916, 918) should be decreased or otherwise changed such that log data is less likely to be generated for the particular component (914, 916, 918). Decreasing the logging level or otherwise changing the logging level such that log data is less likely to be generated for the particular component (914, 916, 918) may occur over time, for example, by decreasing the logging level by one unit after the expiration of a predetermined period of time without experiencing an error. Alternatively, decreasing the logging level or otherwise changing the logging level such that log data is less likely to be generated for the particular component (914, 916, 918) may occur over instantaneously, for example, by decreasing the logging level in response to the occurrence of some event such as the component falling out of alignment with a fingerprint. Increasing the logging level or otherwise changing the logging level such that log data is more likely to be generated for the particular component (914, 916, 918) may also occur over time or instantaneously.

In the example method depicted in FIG. 11, determining (1106) whether the logging level for a component (914, 916, 918) should be changed can include detecting (1108) that an error has been encountered by one or more components (914, 916, 918) in the storage system (902). Detecting (1108) that an error has been encountered by one or more components (914, 916, 918) in the storage system (902) may be carried out, for example, by examining an error log, by examining log data that includes an identification of errors encountered by components within the storage system, by receiving a message or other form of notification from a component that has experienced an error, or in some other way. Readers will appreciate that because an error has been encountered by one or more components (914, 916, 918) in the storage system (902), it may be desirable to have the storage system (902) generate more robust logs such that one or more components (914, 916, 918) in the storage system (902) may be closely monitored.

In the example method depicted in FIG. 11, determining (1106) whether the logging level for a component (914, 916, 918) should be changed can also include detecting (1110) that one or more operating characteristics of the storage system (902) matches a predetermined operating characteristic fingerprint. A predetermined operating characteristic fingerprint may include information that describes the error-related characteristics, performance-related characteristics, state-related characteristics, or any combination of such characteristics that are exhibited by storage systems that are exhibiting a particular behavior. For example, a first predetermined operating characteristic fingerprint may include information indicating that when a particular software component on the storage system has a particular version number, a network adapter on the storage system is receiving more than a predetermined number of requests per unit of time, and the storage devices have less than a predetermined amount of available capacity, the storage system tends to exhibit the behavior of having an average I/O latency that is above an acceptable threshold. In such an example, if it is determined that operating characteristics of the storage system (902) matches such a predetermined operating characteristic fingerprint, the storage system services provider (1102) may determine that the logging level for one or more components (914, 916, 918) should be changed by increasing or otherwise changing the logging level for a particular component (914, 916, 918) such that log data is more likely to be generated for the particular component (914, 916, 918), as being in alignment with the first predetermined operating characteristic fingerprint tends to correlate with storage systems performing at undesirable levels. When the storage system is performing at undesirable levels, additional logging data may be useful as a diagnostic input.

As an additional example, a second predetermined operating characteristic fingerprint may include information indicating that when firmware on the storage devices in the storage system has a particular version number, a network adapter is sending and receiving data using a particular protocol, and a particular software component (e.g., a garbage collection process), the storage system tends to exhibit the behavior of having an average I/O latency that is below an acceptable threshold. In such an example, if it is determined that operating characteristics of the storage system (902) matches such a predetermined operating characteristic fingerprint, the storage system services provider (1102) may determine that the logging level for one or more components (914, 916, 918) should be changed by decreasing or otherwise changing the logging level for a particular component (914, 916, 918) such that log data is less likely to be generated for the particular component (914, 916, 918), as being in alignment with the second predetermined operating characteristic fingerprint tends to correlate with storage systems performing at acceptable levels. When the storage system is performing at acceptable levels, it may be undesirable to dedicate significant resources to performing diagnostic operations on a storage system that appears to be relatively healthy. Readers will appreciate that such predetermined operating characteristic fingerprint may be developed, for example, by processing log data and other forms of telemetry data from many storage systems to identify patterns exhibited by storage systems that are exhibiting (or are predicted to exhibit) some known behavior.

In the example method depicted in FIG. 11, detecting (1110) that one or more operating characteristics of the storage system (902) matches a predetermined operating characteristic fingerprint can include comparing (1112) log data generated by the storage system (902) to one or more operating characteristic fingerprints. Comparing (1112) log data generated by the storage system (902) to one or more operating characteristic fingerprints may be carried out, for example, by an entity such as a controller as the log data is being generated or, in an alternative embodiment, by an entity such as a cloud-based management module, a remote array-services provider, or other entity. As such, comparing (1112) log data generated by the storage system (902) to one or more operating characteristic fingerprints may be part of a larger effort to analyze the content of log data for the purpose of monitoring and evaluating the operation of the storage system (902).

In the example method depicted in FIG. 11, determining (1106) whether the logging level for a component (914, 916, 918) should be changed can also include evaluating (1114) results from a health check of the storage system (902). A health check of the storage system (902) may be performed by one or more modules that are executing on the storage array controller, by one or more modules that are executing on the storage system services provider (1102), or on some other device. Such modules may include computer program instructions that, when executed, perform a scan of the storage system (902) to determine whether various components of the storage system (902), and the storage system (902) generally, are operating within specified parameters. Such a health check may be performed periodically and may provide ongoing analysis of the health of the storage system (902) and the components contained therein. In such an example, if the results from a health check of the storage system (902) indicate that one or more components are not operating as expected, the logging level for one or more components (914, 916, 918) may be changed by increasing or otherwise changing the logging level for a particular component (914, 916, 918) such that log data is more likely to be generated for the particular component (914, 916, 918). Alternatively, if the results from a health check of the storage system (902) indicate that one or more components are operating as expected, the logging level for such components (914, 916, 918) may be changed by decreasing or otherwise changing the logging level for a particular component (914, 916, 918) such that log data is less likely to be generated for the components (914, 916, 918). Evaluating (1114) results from a health check of the storage system (902) may be carried out, for example, by as part of a larger effort to monitor and evaluate the operation of the storage system (902).

In the example method depicted in FIG. 11, determining (1106) whether the logging level for a component (914, 916, 918) should be changed can also include detecting (1116) that a predetermined amount of time has lapsed since an error has been encountered by one or more components (914, 916, 918) in the storage system (902). Detecting (1116) that a predetermined amount of time has lapsed since an error has been encountered by one or more components (914, 916, 918) in the storage system (902) may be carried out, for example, through the use of one or more timers that reset when an error is encountered by one or more particular components (914, 916, 918), by periodically comparing a time stamp that is associated with the last error that was encountered by one or more particular components (914, 916, 918) to a current clock time, and in other ways. In some embodiments, when it is detected (1116) that a predetermined amount of time has lapsed since an error has been encountered by one or more particular components (914, 916, 918), the logging level associated with the one or more particular components (914, 916, 918) may be decreased or otherwise changed such that log data is less likely to be generated for the one or more particular components (914, 916, 918). In such a way, a decay schedule may be set up such that as components return to health and cease encountering errors, the amount of log data that is generated for the one or more particular components (914, 916, 918) decreases.

The example method depicted in FIG. 11 also includes, responsive to affirmatively (1118) determining that the logging level for the component (914, 916, 918) should be changed, changing (1122) the logging level associated with the component (914, 916, 918). Changing (1122) the logging level associated with the component (914, 916, 918) may be carried out, for example, by decreasing the logging level by a predetermined amount, by increasing the logging level a predetermined amount, by increasing the logging level to the highest available value, by decreasing the logging level to the lowest available value, and in other ways. In such an example, changing (1122) the logging level associated with the component may be carried out by issuing a request or command to the storage system (902) to set the logging level for one or more components (914, 916, 918), by the storage system services provider (1102) modifying the logging level for one or more components, or in other ways. Readers will appreciate that if the storage system (902) determines that the logging level for the component (914, 916, 918) should not (1120) be changed, the storage system (902) may continue be monitored.

Readers will appreciate that although the example methods described above are depicted in a way where a series of steps occurs in a particular order, no particular ordering of the steps is required unless explicitly stated. Example embodiments of the present disclosure are described largely in the context of a fully functional computer system for dynamically adjusting an amount of log data generated for a storage system. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to some embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
setting, for a component of a plurality of components within a storage system, a logging level for the component, the logging level specifying the extent to which log data should be generated for a particular component, wherein the component comprises a hardware component;
determining, in dependence upon one or more measured performance characteristics of the storage system, whether the logging level for the component should be changed, including detecting that one or more performance-related characteristics of the storage system matches a predetermined fingerprint, wherein the determination further comprises determining, for each of the plurality of components, that the logging level should be changed, including detecting that a predetermined amount of time has lapsed since an error has been encountered by each respective component within the storage system; and
responsive to determining that the logging level for the component should be changed, changing the logging level associated with the component.

2. The method of claim 1 wherein determining that the logging level for the component should be changed further comprises detecting that an error has been encountered by one or more components in the storage system.

3. The method of claim 1, wherein the measured performance characteristics of the storage system includes a number of I/O requests serviced by the storage system during a predetermined period of time.

4. The method of claim 1 wherein detecting that one or more performance characteristics of the storage system matches a predetermined performance characteristic fingerprint further comprises comparing log data generated by the storage system to one or more operating characteristic fingerprints.

5. The method of claim 1 wherein determining that the logging level for the component should be changed further comprises evaluating results from a health check of the storage system.

6. The method of claim 1, wherein the measured performance characteristics of the storage system includes the amount of data transferred to service I/O operations directed to the storage system during a predetermined period of time.

7. The method of claim 1, wherein the measured performance characteristics of the storage system includes the average response time taken to service I/O requests directed to the storage system.

8. A method comprising:
receiving log data from a storage system;
determining, in dependence upon one or more measured performance characteristics of the storage system, whether the logging level for a component of a plurality of components within the storage system should be changed including detecting that one or more performance-related characteristics of the storage system matches a predetermined fingerprint, the logging level specifying the extent to which log data should be generated for a particular component, wherein the component comprises a hardware component, wherein the determination further comprises determining, for each of the plurality of components, that the logging level should be changed, including detecting that a predetermined amount of time has lapsed since an error has been encountered by each respective component within the storage system; and responsive to determining that the logging level for the component should be changed, changing the logging level associated with the component.

9. The method of claim 8 wherein determining that the logging level for the component should be changed further comprises detecting that an error has been encountered by one or more components in the storage system.

10. The method of claim 8 wherein detecting that one or more performance characteristics of the storage system matches a predetermined performance characteristic fingerprint further comprises comparing log data generated by the storage system to one or more operating characteristic fingerprints.

11. The method of claim 8 wherein determining that the logging level for the component should be changed further comprises evaluating results from a health check of the storage system.

12. An apparatus comprising a computer processor, a computer memory operatively coupled to the computer processor, the computer memory having disposed within it computer program instructions that, when executed by the computer processor, cause the processor of the apparatus to carry out the steps of:

determining, in dependence upon one or more measured performance characteristics of the storage system, whether a logging level for a component of a plurality of components within the storage system should be changed including detecting that one or more performance-related-characteristics of a storage system matches a predetermined fingerprint, the logging level specifying the extent to which log data should be generated for a particular component, wherein the component comprises a hardware component, wherein the determination further comprises determining, for each of the plurality of components, that the logging level should be changed, including detecting that a predetermined amount of time has lapsed since an error has been encountered by each respective component within the storage system; and responsive to determining that the logging level for the component should be changed, changing the logging level associated with the component.

13. The apparatus of claim 12 further comprising computer program instructions that, when executed by the computer processor, cause the processor of the apparatus to carry out the step of receiving log data from the storage system.

14. The apparatus of claim 12 further comprising computer program instructions that, when executed by the computer processor, cause the processor of the apparatus to carry out the steps of setting, by the storage system services provider, for a component within the storage system, a logging level for the component, the logging level specifying the extent to which log data should be generated for a particular component.

15. The apparatus of claim 12 wherein determining that the logging level for the component should be changed further comprises detecting that an error has been encountered by one or more components in the storage system.

16. The apparatus of claim 12 wherein detecting that one or more performance characteristics of the storage system matches a predetermined performance characteristic fingerprint further comprises comparing log data generated by the storage system to one or more fingerprints.

17. The apparatus of claim 12 wherein determining that the logging level for the component should be changed further comprises evaluating results from a health check of the storage system.

18. The apparatus of claim 12 wherein determining, in dependence upon one or more measured performance characteristics of the storage system, that the logging level for the component should be changed further comprises detecting that a predetermined amount of time has lapsed since an error has been encountered by one or more components in the storage system.

* * * * *